(12) United States Patent
Bhattad et al.

(10) Patent No.: US 11,633,790 B2
(45) Date of Patent: Apr. 25, 2023

(54) METHOD FOR RAPID DEVELOPMENT OF ADDITIVE MANUFACTURING PARAMETER SET

(71) Applicant: Carl Zeiss Industrial Metrology, LLC, North Maple Grove, MN (US)

(72) Inventors: Pradeep Bhattad, Knoxville, TN (US); Paul Brackman, Knoxville, TN (US); Curtis Frederick, Knoxville, TN (US); Marcin B. Bauza, Plymouth, MN (US); Edson Costa Santos, Oberkochen (DE); Ryan Dehoff, Knoxville, TN (US); Alex Plotkowski, Knoxville, TN (US); Aleksandr Lisovich, Plymouth, MN (US); Jason James Tenboer, Elk River, MN (US)

(73) Assignees: Carl Zeiss Industrial Metrology, LLC, North Maple Grove, MN (US); UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/777,598

(22) PCT Filed: Nov. 18, 2020

(86) PCT No.: PCT/US2020/061122
§ 371 (c)(1),
(2) Date: May 17, 2022

(87) PCT Pub. No.: WO2021/102047
PCT Pub. Date: May 27, 2021

(65) Prior Publication Data
US 2022/0371094 A1 Nov. 24, 2022

Related U.S. Application Data

(60) Provisional application No. 62/937,150, filed on Nov. 18, 2019.

(51) Int. Cl.
*B22F 10/85* (2021.01)
*B33Y 10/00* (2015.01)
(Continued)

(52) U.S. Cl.
CPC .............. *B22F 10/85* (2021.01); *B22F 10/28* (2021.01); *B22F 12/90* (2021.01); *B33Y 10/00* (2014.12);
(Continued)

(58) Field of Classification Search
None
See application file for complete search history.

(56) References Cited

U.S. PATENT DOCUMENTS

2016/0098825 A1  4/2016  Dave et al.
2018/0144070 A1  5/2018  Golway et al.

FOREIGN PATENT DOCUMENTS

WO    2019206903 A1    10/2019

OTHER PUBLICATIONS

USPTO as International Searching Authority, International Search Report and Written Opinion for App. No. PCT/US2020/061122, dated Feb. 11, 2021.

*Primary Examiner* — Colin W. Slifka
(74) *Attorney, Agent, or Firm* — Miller Johnson

(57) ABSTRACT

An apparatus includes a control system that defines a test part having multiple features of multiple feature types. The control system controls an additive manufacturing (AM) machine to print multiple copies of the test part, with each copy being printed according to a respective set of values used as printing parameters. A measurement system obtains a computed tomography (CT) image of each of the copies of the test part. An analysis system, for each of the plurality of feature types, analyzes the CT images to identify a selected set of values for the printing parameters. The analysis (Continued)

system identifies a portion of the CT image related to a first feature and assesses its density based on an average grayscale value. The AM machine is then controlled to print production parts according to, for each feature type of the production parts, the selected set of values for the printing parameters.

34 Claims, 14 Drawing Sheets

(51) Int. Cl.
  *B33Y 30/00* (2015.01)
  *B33Y 50/02* (2015.01)
  *G06T 7/33* (2017.01)
  *B22F 12/90* (2021.01)
  *B22F 10/28* (2021.01)
  *G06V 30/18* (2022.01)
  *G06V 10/44* (2022.01)
  *G06T 7/00* (2017.01)
  *G06T 11/00* (2006.01)

(52) U.S. Cl.
  CPC .............. *B33Y 30/00* (2014.12); *B33Y 50/02* (2014.12); *G06T 7/0006* (2013.01); *G06T 7/337* (2017.01); *G06T 11/005* (2013.01); *G06V 10/44* (2022.01); *G06V 30/18019* (2022.01); *G06T 2207/30144* (2013.01)

METHOD FOR RAPID DEVELOPMENT OF ADDITIVE MANUFACTURING PARAMETER SET

CROSS-REFERENCE TO RELATED APPLICATIONS

This application is a National Stage of International Application No. PCT/US2020/061122 filed Nov. 18, 2020. This application claims the benefit of U.S. Provisional Application No. 62/937,150 filed Nov. 18, 2019. The entire disclosures of the above applications are incorporated by reference.

STATEMENT REGARDING FEDERALLY SPONSORED RESEARCH OR DEVELOPMENT

This invention was made under CRADA No. NFE-19-07705 between Carl Zeiss Industrial Metrology LLC and UT-Battelle, LLC, management and operating contractor for the Oak Ridge National Laboratory for the United States Department of Energy. The Government has certain rights in this invention.

FIELD

The present disclosure relates to element manufacturing and more particularly to systems and methods for developing manufacturing parameters for additive manufacturing.

BACKGROUND

Additive manufacturing allows parts to be manufactured without requiring the capital investment of creating dies or molds. This allows low-volume parts to be manufactured more cheaply and more quickly, with less lead time between design and manufacture. In fact, with additive manufacturing, single parts may even be produced on-demand Additive manufacturing may allow for parts to be formed that are difficult or impossible using traditional processes.

However, additive manufacturing poses unique challenges. The actual production of a particular part using additive manufacturing is generally much slower than traditional manufacturing processes because additive manufacturing relies on building the part layer upon layer. This is in contrast with traditional techniques such as casting or injection molding, during which the entire part is produced at one time.

The surface quality and internal features of a part may vary based on the printing parameters used to print the part. Decreasing the spacing between printing scans may allow for finer resolution, but slows the manufacturing process and may cause other issues with part quality (for example, overlapping heat loads from multiple passes may cause deformities).

Different portions of the part may require different printing parameters. For example, a powder with metallic and/or polymer components may be used in additive manufacturing processes such as selective laser sintering (SLS) or selective laser melting (SLM). In an example laser-based process, scan speed, laser power, hatch spacing, and layer spacing may be adjusted to produce a finished part with the desired surface smoothness and lack of internal defects. Developing these parameters is a process of weeks or months and represents a significant burden for widespread deployment of additive manufacturing and consistent quality among manufactured parts.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In summary of the below description, important aspects of the invention are defined in accordance with one or more of the following clauses.

An apparatus includes a control system configured to define a test part having a plurality of features of a plurality of feature types. The plurality of features includes a first feature that is a bulk type. The control system is configured to control an additive manufacturing (AM) machine to print multiple copies of the test part. The AM machine operates according to a plurality of printing parameters. The control system is configured to generate, for each of the multiple copies, a set of values for the plurality of printing parameters. The control system is configured to control the AM machine to print each of the multiple copies according to the respective set of values for the plurality of printing parameters. The apparatus includes a measurement system configured to obtain a computed tomography (CT) image of each of the copies of the test part. The apparatus includes an analysis system configured to, for each of the plurality of feature types, analyze the CT images to identify a selected set of values for the plurality of printing parameters. The analysis system is configured to identify a portion of the CT image related to the first feature and assess density of the first feature based on an average grayscale value of the portion of the CT image. The control system is configured to control the AM machine to print production parts according to, for each feature type of the production parts, the selected set of values for the plurality of printing parameters.

In other features, the control system is configured to control the AM machine to print the multiple copies of the test part in response to a new printing material being introduced to the AM machine. In other features, the printing material is a powder. In other features, the AM machine uses selective laser sintering (SLS). In other features, for each of the multiple copies, the set of values of the plurality of printing parameters is distinct from all others of the multiple copies. In other features, the control system is configured to control the AM machine to print a second batch of multiple copies of the test part in response to, for at least one of the feature types, the selected set of values for the plurality of printing parameters resulting in at least one feature of merit falling short of a threshold.

In other features, the apparatus includes a sample holder configured to hold a first part of the multiple copies. The sample holder includes at least one calibration standard having known density values. The analysis system is configured to calibrate values of the CT image according to a relationship between measured values of the at least one calibration standard and the known density values. In other features, the plurality of feature types includes the bulk type, a vertical fin type, a hole type, and a rod type. In other features, the plurality of feature types includes the bulk type, the vertical fin type, a horizontal cylindrical hole type, a vertical cylindrical hole type, a horizontal rod type, and a vertical rod type.

In other features, the plurality of feature types includes the bulk type and an inclined fin type. The features having the inclined fin type are removed from the multiple copies. The features having the inclined fin type are measured using at least one of an optical microscope and a coordinate measuring machine. In other features, the analysis system is configured to align the CT image of each of the copies of the test part with a test part design to identify each of the plurality of features on each of the copies of the test part.

In other features, the analysis system is configured to identify each of the copies of the test part by reading a unique identifier on the test part. The unique identifiers for the copies of the test parts are created as part of printing by the AM machine. In other features, the analysis system is configured to read the unique identifier using optical character recognition (OCR). In other features, the unique identifier includes at least one of a one dimensional barcode and a two-dimensional barcode.

In other features, the plurality of feature types includes a periphery defined within an outer surface of the test part and a predetermined distance from the outer surface. In other features, the analysis system is configured to analyze a microstructure of each of the copies of the test part using at least one of X-ray diffraction imaging, X-ray contrast tomography, scanning electron microscope (SEM)-based electron backscatter diffraction (EBSD), and optical (light) microscopy.

A method includes defining a test part having a plurality of features of a plurality of feature types. The plurality of features includes a first feature that is a bulk type. The method includes controlling an additive manufacturing (AM) machine to print multiple copies of the test part. The AM machine operates according to a plurality of printing parameters. The controlling includes, for each of the multiple copies, generating a set of values for the plurality of printing parameters. The controlling controls the AM machine to print each of the multiple copies according to the respective set of values for the plurality of printing parameters. The method includes obtaining a computed tomography (CT) image of each of the copies of the test part. The method includes, for each of the plurality of feature types, analyzing the CT images to identify a selected set of values for the plurality of printing parameters. The analyzing includes identifying a portion of the CT image related to the first feature and assessing density of the first feature based on an average grayscale value of the portion of the CT image. The method includes controlling the AM machine to print production parts according to, for each feature type of the production parts, the selected set of values for the plurality of printing parameters.

In other features, the method includes controlling the AM machine to print the multiple copies of the test part in response to a new printing material being introduced to the AM machine. In other features, the printing material is a powder. In other features, the AM machine uses selective laser sintering (SLS). In other features, for each of the multiple copies, the set of values of the plurality of printing parameters is distinct from all others of the multiple copies. In other features, the method includes controlling the AM machine to print a second batch of multiple copies of the test part in response to, for at least one of the feature types, the selected set of values for the plurality of printing parameters resulting in at least one feature of merit falling short of a threshold.

In other features, the method includes calibrating values of the CT image according to a relationship between measured values of at least one calibration standard and known density values of the at least one calibration standard. In other features, the plurality of feature types includes the bulk type, a vertical fin type, a hole type, and a rod type. In other features, the plurality of feature types includes the bulk type, the vertical fin type, a horizontal cylindrical hole type, a vertical cylindrical hole type, a horizontal rod type, and a vertical rod type.

In other features, the plurality of feature types includes the bulk type and an inclined fin type. The method includes removing features having the inclined fin type from the multiple copies and measuring the features having the inclined fin type using at least one of an optical microscope and a coordinate measuring machine. In other features, the method includes aligning the CT image of each of the copies of the test part with a test part design to identify each of the plurality of features on each of the copies of the test part. In other features, the method includes identifying each of the copies of the test part by reading a unique identifier on the test part. The unique identifiers for the copies of the test parts are created as part of printing by the AM machine.

In other features, the reading includes optical character recognition (OCR). In other features, the unique identifier includes at least one of a one dimensional barcode and a two-dimensional barcode. In other features, the plurality of feature types includes a periphery defined within an outer surface of the test part and a predetermined distance from the outer surface. In other features, the method includes analyzing a microstructure of each of the copies of the test part using at least one of X-ray diffraction imaging, X-ray contrast tomography, scanning electron microscope (SEM)-based electron backscatter diffraction (EBSD), and optical (light) microscopy.

A non-transitory computer-readable medium stores processor-executable instructions that embody the method of one of the above clauses. An apparatus is configured to implement the method of one of the above clauses. Each of the features described above may be implemented in and/or combined with one or more other features.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Overview

Figure 1:
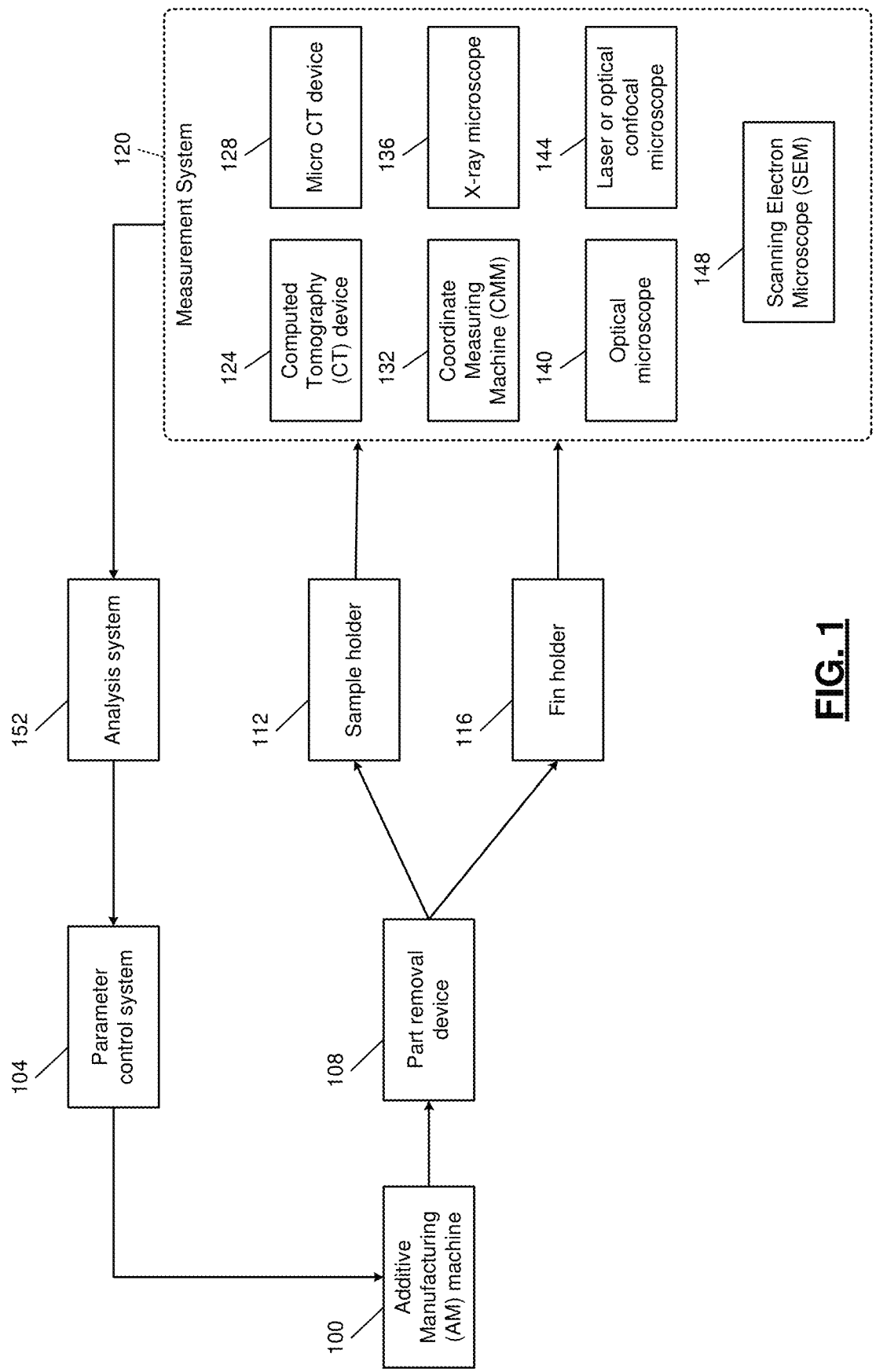
FIG. 1 is a functional block diagram of an example adaptive additive manufacturing system according to the principles of the present disclosure.

The present disclosure describes systems and methods for rapid development of and use of material-specific additive manufacturing parameter sets. While prior art development cycles for additive manufacturing parameter sets occurred on the order of weeks or months, the present disclosure allows for development cycles on the order of days and, in some cases, less than 24 or 48 hours. By reducing the length of this design cycle, manufacturers (that is, anyone implementing additive manufacturing processes) can take advantage of tuned printing parameters.

Every time that a material formulation or material supplier changes, printing parameters can be adjusted or at least verified. However, with the long lead time existing in the prior art, some manufacturers may skip this process. Further, with successive batches of the same material formulation, manufacturers generally do not have the time to test each batch for consistency. Meanwhile, according to the present disclosure, each new batch of material (such as a metal and/or polymer powder) can be tested and tuned printing parameters developed for that particular batch of material.

All additive manufacturing processes have a variety of adjustable printing parameters. For example, in selective laser sintering (SLS) or selective laser melting (SLM), laser power, scan speed, hatch spacing, and layer spacing may be adjusted. Some additive manufacturing machines allow for these parameters to be adjusted within a single layer depending on the feature being printed. For example, if a part includes a horizontally oriented rod and a vertically oriented rod, different printing parameters may be used for each to achieve desired figures of merit (surface smoothness, dimensional accuracy, etc.) for each. Moreover, different printing parameters may be used in different regions of a single feature, such as one set of printing parameters for a central portion of the feature and another distinct set of parameters for a periphery of the feature.

A test part is defined with a number of features that test the additive manufacturing process in various ways. Test parts may be printed in different sizes depending on a size of the printer and/or a size of the final product part to be printed. Example test parts are described in more detail in FIGS. 2A-2D, 5A-5C, and 7-12. To increase test throughput, multiple copies of the test part can be printed at one time on a build plate. For example, an array of these test parts, such as the example array shown in FIG. 6, may be printed simultaneously. The number of test parts in the array may be constrained by the print size limitations of the additive manufacturing machine. Some additive manufacturing machines may exhibit different or degraded properties near the edges of the print area. For such machines, those regions may be avoided for placement of test parts. In this way, machine variation near the edges of the test print area may be reduced or eliminated.

When the printable area is square and the test parts have a square base portion, a square grid of the test parts may be printed, such as a 7×7 grid or a 10×10 grid. Each part may be printed using a distinct set of printing parameters. For example, vertically oriented rods in each of the parts will be printed using a different laser power. In some implementations, multiple parameters are varied across the test parts. For example, the vertically oriented rods of each test part may be printed using a unique set of laser power, scan speed, and hatch spacing.

After the array of test parts is printed on a build plate, the test parts are separated from the build plate and each test part is analyzed. The printing parameters that generate the best features are selected for future printing. If none of the sets of parameters results in acceptable figures of merit for a particular type of feature, a new array of printing parameters may be used in generating a new array of test parts. Acceptable parameters (which may be determined to be the best printing parameters) for each type of feature (such as rods, holes, etc.) are noted and used for manufacturing non-test parts (production parts).

Each time that a new batch of printing material is received, another array of test parts can be built and tested to confirm the adequacy of the printing parameters. If variance of the existing printing parameters result in improved characterizes of merit in the test parts, these varied parameters may be used to print non-test production parts with the new batch of printing material.

If a new supplier or formulation of printing material is received, the existing printing parameters may be ignored and a new open-loop set of printing parameters, such as those recommended by the supplier, can be used as a baseline. Larger variations on these baseline printing parameters may be used in generating the array of test parts to optimize production of various features of the test parts. The wider variation in printing parameters for previously unknown printing materials is employed to avoid optimizing to a local maximum but not the global maximum.

An array of test parts may be printed according to a design of experiments (DoE) and analyzed for reasons other than receipt of a new batch of printing material. For example, an array of test parts may be built and analyzed to determine initial parameters for a new production part (with the same or different printing material), to optimize parameters for an existing production part, to analyze additive manufacturing machine malfunction, when modifying print strategy (such as order and direction of printing), and/or to optimize or identify a build envelope (such as location of printing on a build plate).

In FIG. 1, an additive manufacturing (AM) machine 100 operates based on printing parameters from a parameter control system 104. To develop a set of parameters, the AM machine 100 builds an array of test parts. A part removal device 108 separates the individual parts from the build plate. For example, the part removal device 108 may include a saw (such as a band saw) or a laser. The part removal device 108 may also remove inclined (angled) fins from the test part.

A sample holder 112 includes datums that hold the test part in a known orientation so that any variations in the test part can be measured without concern for how the part is fixed in the sample holder 112. The sample holder 112 may hold the test part before or after the fins are removed. In various implementations, multiple sample holders may be used to accommodate multiple parts. In various implementations, the sample holder 112 may hold more than one part at a time. These test parts in one or more sample holders may be measured simultaneously to improve throughput.

The inclined fins are loaded into a fin holder 116, which exposes faces of the fins for measurement. In various implementations, the fin holder 116 may be rotated upside down to expose the opposite faces of the fins. In other implementations, a second fin holder (not shown) may be used to hold the fins to expose the opposite faces of the fins. The fins of multiple test parts may be held by one or more fin holders.

A measurement system 120 includes one or more devices that measure the test part in the sample holder 112 and/or the fins in the fin holder 116. For example, the measurement system 120 may include a conventional X-ray computed tomography (CT) device 124, an X-ray micro CT device 128, a coordinate measuring machine (CMM) 132, an X-ray microscope 136, an optical microscope 140 (also called a light microscope), a confocal microscope 144, such as a laser confocal microscope or an optical confocal microscope, and a scanning electron microscope (SEM) 148. As used herein "CT device" may refer generally to the conventional CT device 124, the micro CT device 128, or both the conventional CT device 124 and the micro CT device 128. The Each of the devices of the measurement system 120 may be used to measure the test part in the sample holder 112, the fin holder 116, and/or another holder. In various implementations, the CT device 124, the micro CT device 128, the X-ray microscope 136, the SEM 148 are used to measure the part in the sample holder 112, while the CMM 132, the optical microscope 140, and/or the laser or optical confocal microscope 144 are used to measure faces of the fins in the fin holder 116. The measurement system 120 provides measurement data to an analysis system 152.

The analysis system 152 assesses build quality of various features of each test part and identifies printing parameters to achieve acceptable or desired characteristics of each feature. The printing parameters are supplied to the parameter control system 104 for use in future printing. If additional tuning of the printing parameters as necessary, the AM machine 100 will print a new array of parts using a new array of printing parameters. Together, the analysis system, the measurement system 120, and the parameter control system 104 form an apparatus that controls the AM machine 100 to select printing parameters. In various implementations, two or more of the analysis system 152, the measurement system 120, and the parameter control system 104 may be combined, or each may be implemented as separate systems. In various implementations, each of the analysis system 152, the measurement system 120, and the parameter control system 104 may be implemented using and/or controlled by one or more computing systems, each including processor hardware and memory hardware.

Figure 2B:
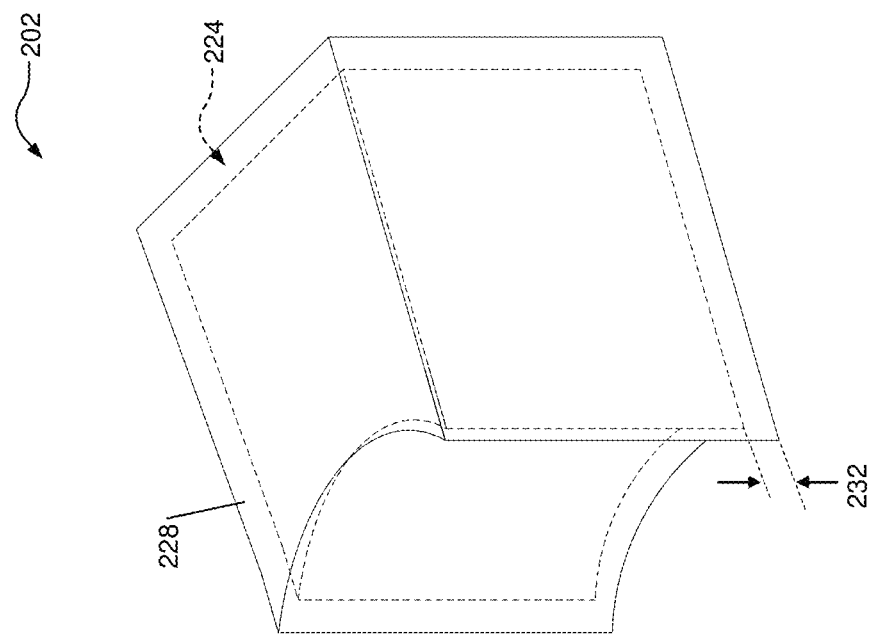
FIG. 2B is an isometric view of a bulk section of the test part of FIG. 2A.
Figure 2A:
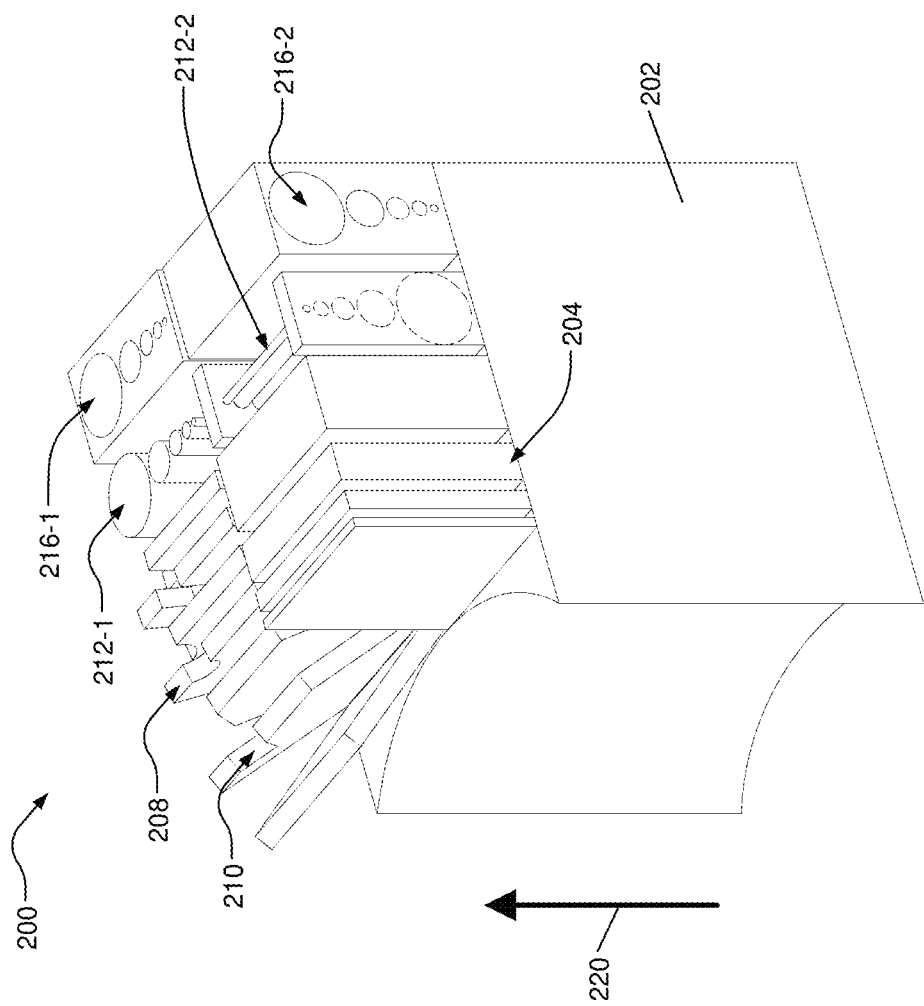
FIG. 2A is an isometric view of an example test part.

In FIG. 2A, an example test part 200 is shown. A bulk section 202 is solid material and allows for analysis of porosity in the printing process. Straight fins 204 of varying thickness allow analysis of thickness and dimensional accuracy and porosity. Inclined fins 208 allow for determinations of surface roughness of both the top face (up skin) and the bottom face (down skin). Because additive manufacturing prints in layers, greater angles of inclined fins may be printed in a manner that begins to look like stair steps.

Vertical rods 212-1 and horizontal rods 212-2, which are cylindrical and of varying diameters in this example, are included to assess dimensional accuracy and resolution. Vertical holes 216-1 and horizontal holes 216-2, which are also cylindrical in this example and vary in diameter, allow for determination of dimensional accuracy and resolution.

The test part 200 is printed in layers that are applied on top of one another in a direction 220. The features may located on the test part 200 such that features that are most likely to fail during printing are printed last (or disposed furthest in the direction 220 compared to other instances of the feature). Accordingly, in various aspects, the horizontal rods 212-2 are printed with a largest diameter rod being first and a smallest diameter rod being last (that is, the smallest diameter rod is disposed in the direction 220 with respect to the largest diameter rod). The horizontal holes 216-2 are printed with a smallest diameter hole being first and a largest diameter hole being last (that is, the largest diameter hole is disposed in the direction 220 with respect to the smallest diameter hole).

In various implementations, different regions of each of the features may be considered to be distinct features to be optimized. For example, FIG. 2B shows the bulk section 202 separately from the remainder of the test part 200. A periphery 224 is defined within the bulk section 202. The periphery 224 is not a separate component, but rather, a user-defined region resembling a three-dimensional shell. The periphery 224 is defined within an outer surface 228 of the bulk section and a predetermined distance 232 inside the outer surface 228. Analyzing the periphery 224 separately from the bulk section 202 as a whole may be useful because characteristics of the bulk section may be different at and adjacent to the outer surface 228 than in the remainder of the bulk section 202.

Each feature may define its own periphery. In some examples, peripheries of two features are analyzed adjacent to an intersection of the two features (such as bulk and a straight fin). In various implementations, the predetermined distance is in a range of 0.5 µm-10 mm (for example, 0.5-5 µm, 5-50 µm, 50-100 µm, 100-500 µm, 500 µm-1 mm, 1-2 mm, 2-5 mm, or 5-10 mm). In various implementations, feature (such as the bulk potion) defines three dimensions in an orthogonal coordinate system. The predetermined distance is defined as a percentage of a largest dimension of the three dimensions. For example, the percentage may be $10^{-6}$-0.1% (for example, $10^{-6}$-$10^{-5}$%, $10^{-5}$-$10^{-4}$% $10^{-4}$-0.001%, 0.001-0.01%, or 0.01%-0.1%).

Figure 2C:
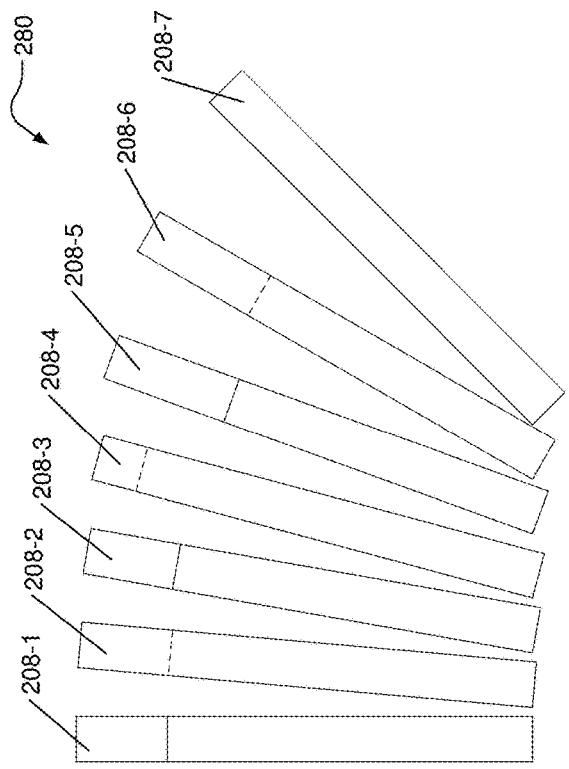
FIG. 2C is an isometric view of inclined fins of the test part of FIG. 2A.
Figure 2D:
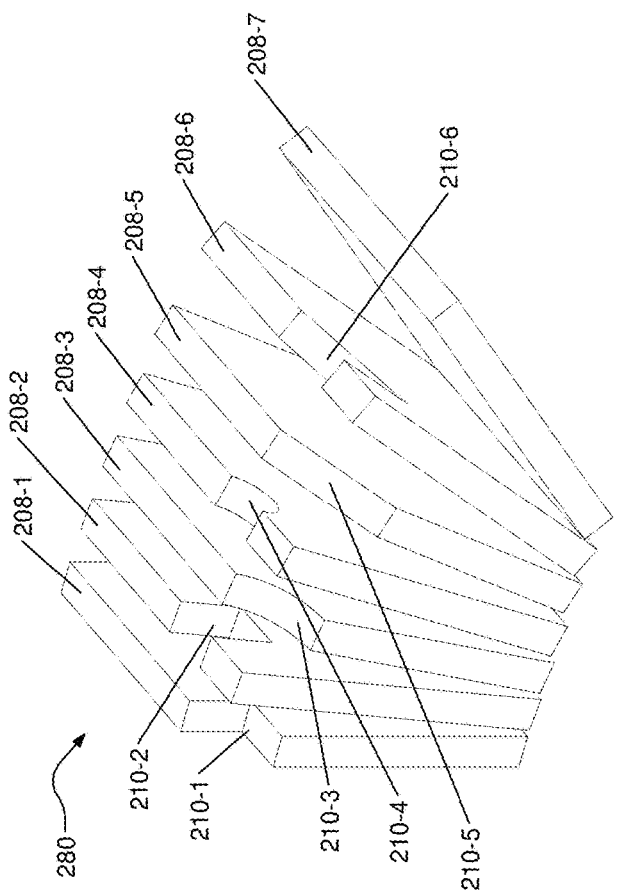
FIG. 2D is a side view of the inclined fins of FIG. 2C.

In FIGS. 2C-2D, the fins 208 are shown separately from the remainder of the test part 200. The fins 208 include individual fins 208-1, 208-2, 208-3, 208-4, 208-5, 208-6, and 208-7. The fin 208-1 is disposed substantially parallel to a vertical direction, while each other fin is printed at an increasing angle from vertical, with the fin 208-7 being disposed at the greatest angle with respect to vertical. Additionally, each of the fins 208 has a particular notch profile 210-1, 210-2, 210-3, 210-4, 210-5, 210-6 (or, for fin 208-7, no notch) that allows the fins to be differentiated from each other when separated from the bulk section 202. In addition, because the notches are asymmetric, the respective faces of the fins 208 can also be identified once the fins 208 are separated from the bulk section 202.

Especially for the fins deviating the most from vertical (especially the fin 208-7), printing limitations may prevent the fin (and corresponding notch) from being fully printed. To allow identification of fins, unique identifiers may be manufactured into the fins 208—either raised or indented. The unique identifiers may identify which fin is which, and from which test part it came. The unique identifiers may be used in addition to the notches 210 or as an alternative to the notches 210. Each of the test parts may also be defined to include unique identifiers to distinguish one test part from another.

Figure 3:
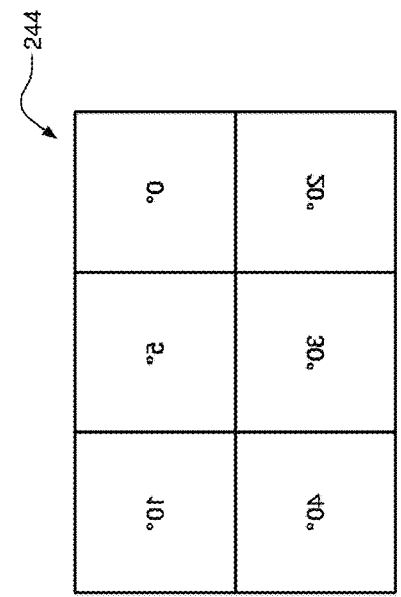
FIG. 3 is a functional representation of a sample holder for inclined fins.

In FIG. 3, a functional representation of a fin holder 240 is shown. While more or fewer fins may be held, the example fin holder 240 is designed for six fins—which is different from the example of FIGS. 2A and 2C-2D, which shows seven inclined fins.

Figure 4:
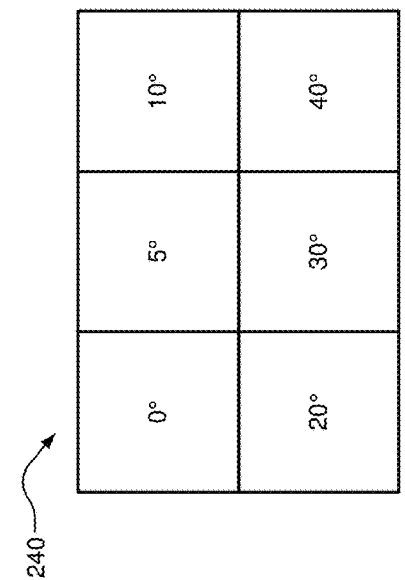
FIG. 4 is a functional representation of a sample holder for inclined fins in which an opposite face of the fins is exposed.

In FIG. 4, a fin holder 244 exposes opposite faces of the fins. In the holders 240 and 244, specific locations are designated for the varying angles of the fins. In this particular example, the printing angles of the inclined fins are 0°, 5°, 10°, 20°, 30°, and 40°, respectively. In various implementations, the fin holder 240 and the fin holder 244 may be the same physical structure, where the fin holder 244 is simply an upside down orientation of the fin holder 240.

Figure 5B:
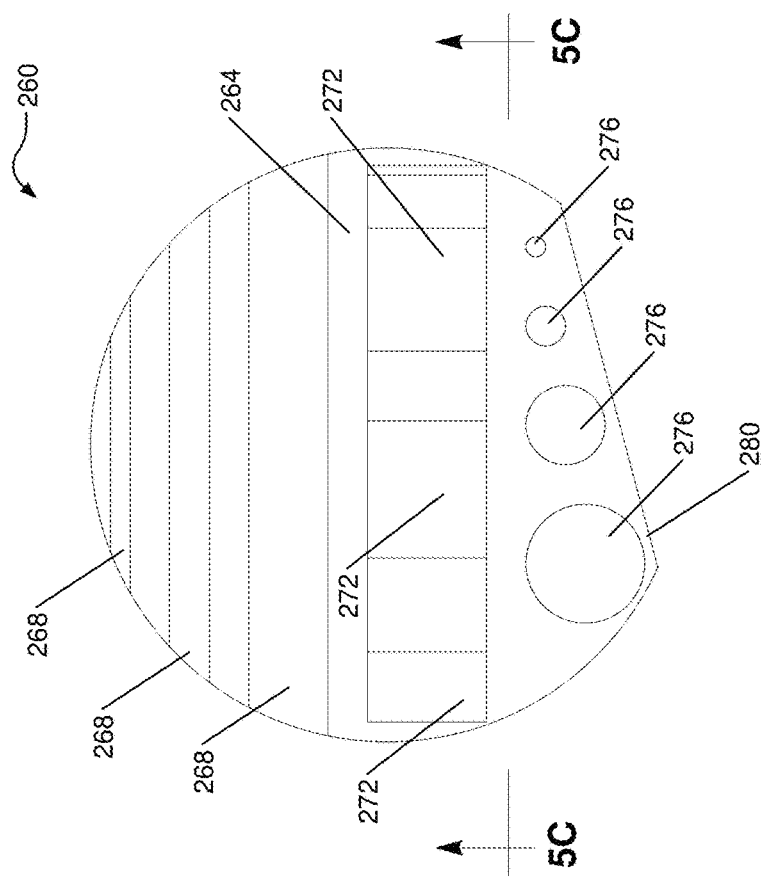
FIG. 5B is a top view of the test part of FIG. 5A.
Figure 5A:
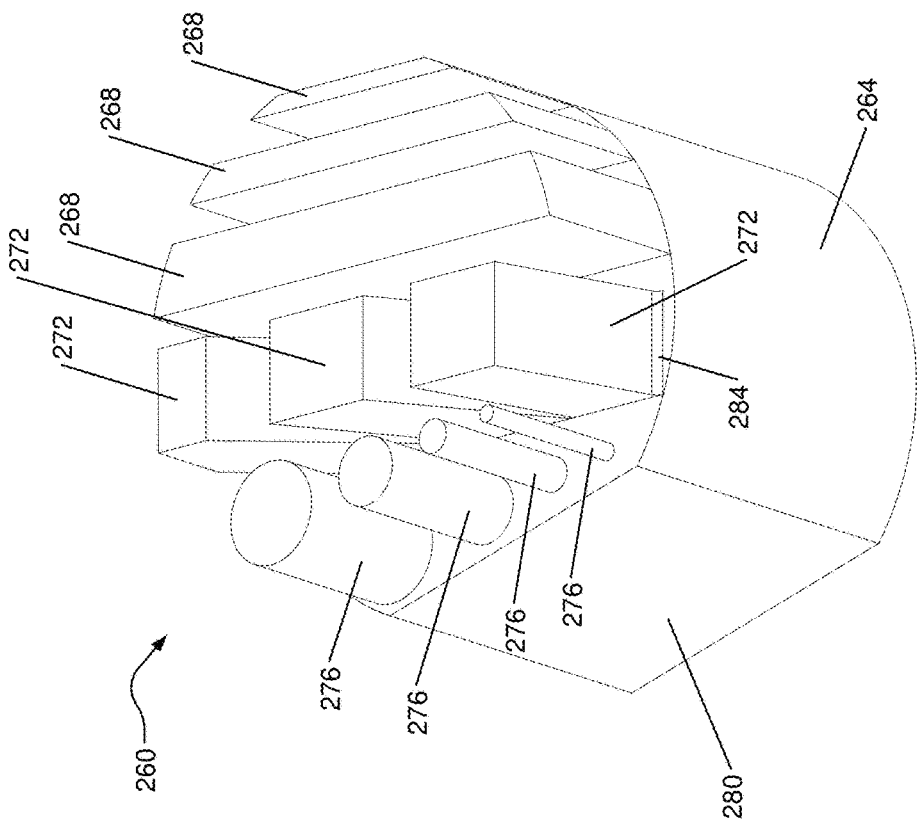
FIG. 5A is an isometric view of another example test part.
Figure 5C:
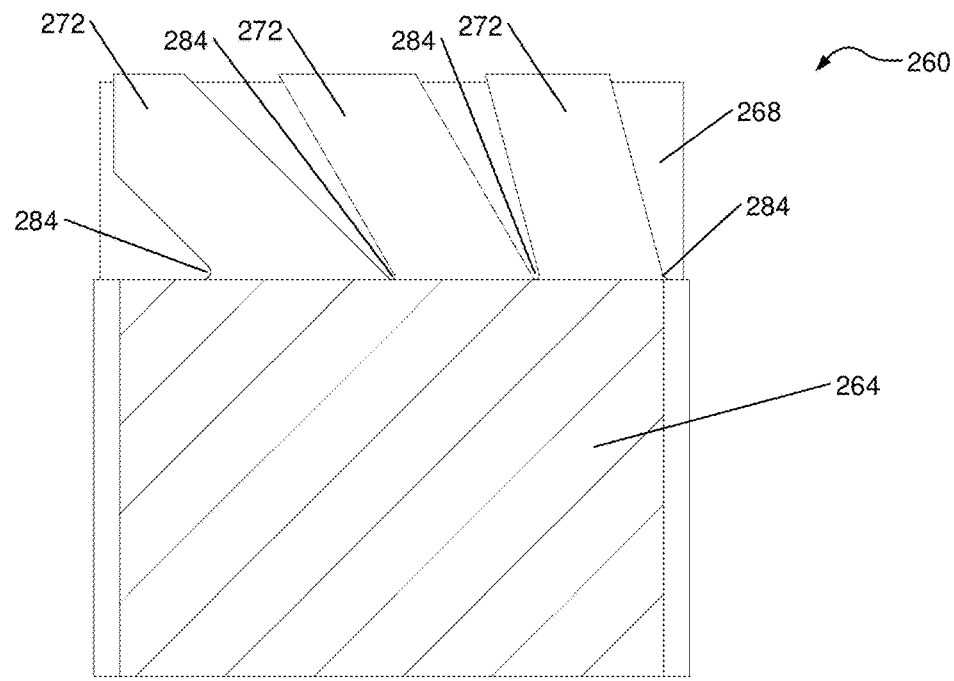
FIG. 5C is a sectional view of the test part of FIG. 5A.

In FIGS. 5A-5C, another example test part 260 is shown. The test part 260 includes a bulk section 264, straight fins 268, inclined fins 272, and vertical rods 276. The bulk section 264 is a horizontal cylindrical segment. That is, the bulk section 264 is generally cylindrical with a planar face 280. Engagement of the planar face 280 with a sample holder may reduce or prevent rotation of the test part 260 within the sample holder. The planar face 280 may be printed reliably, and may therefore permit insertion of the test part 260 into a sample holder even when surface roughness and/or deformation are present.

The straight fins 268 vary in thickness and may be similar to the straight fins 204 of the test part of FIG. 2A. Each of the inclined fins 272 includes a fillet 284 adjacent to the bulk section 264. The vertical rods 276 are generally cylindrical and vary in diameter.

Figure 6:
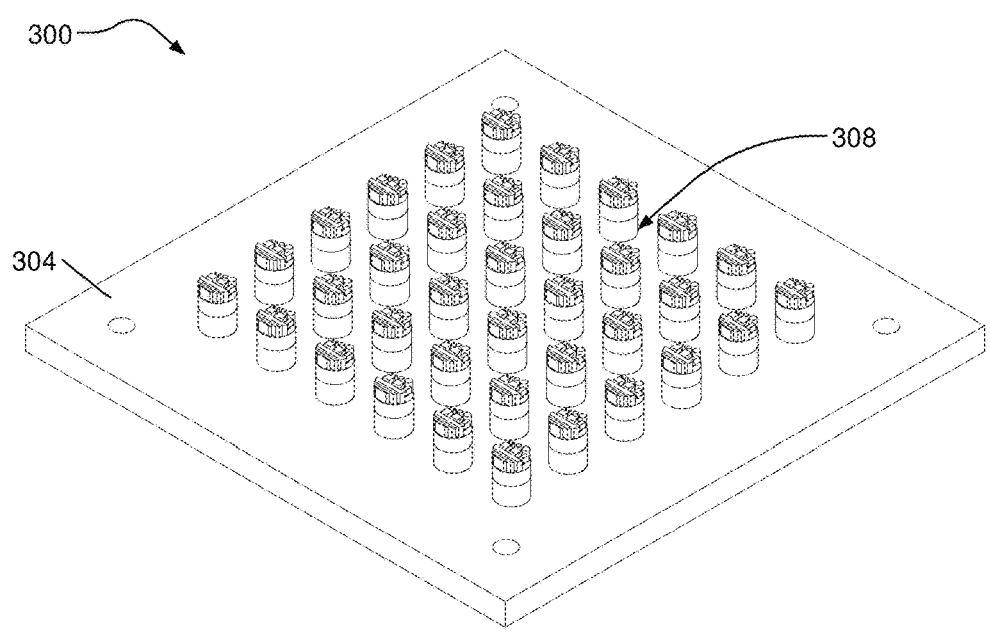
FIG. 6 is an isometric view of a build including an array of test part copies.

In FIG. 6, an example test part build 300 is shown. The build 300 includes a build plate 304 and an array 308 of test parts. In various implementations, the test parts are similar to the test part 260 of FIGS. 5A-5C.

Figure 7:
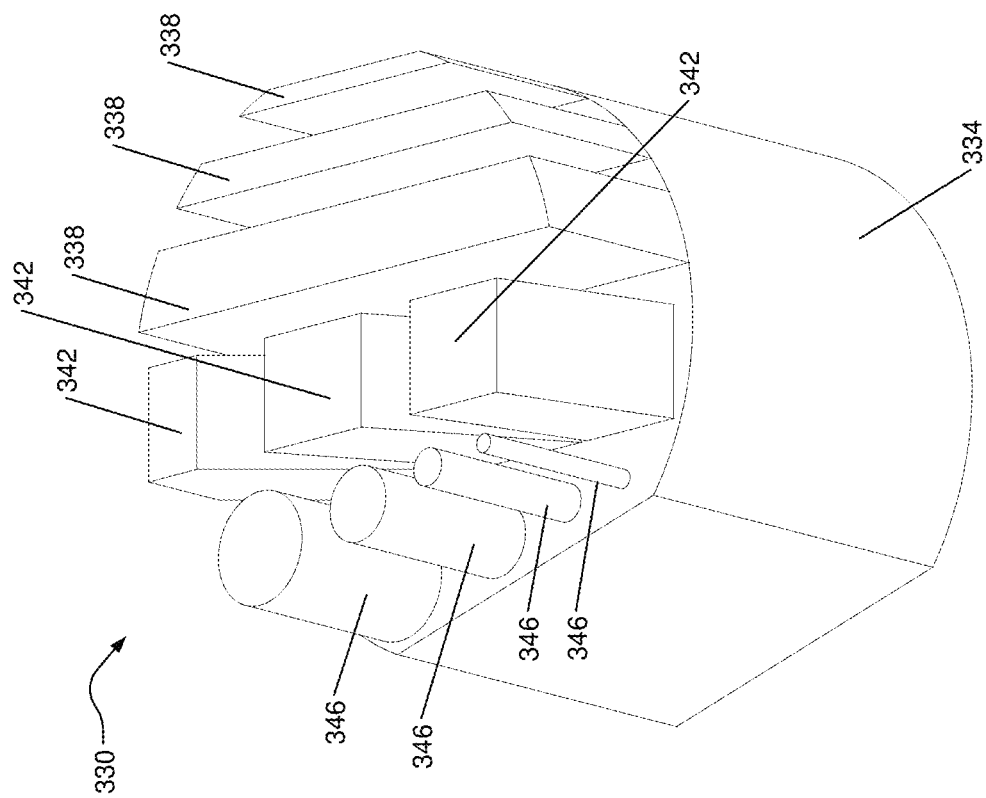
FIG. 7 is an isometric view of another test part.

In FIG. 7, another example test part 330 is shown. The test part 330 is similar to the test part 260 of FIGS. 5A-5C. More particularly, the test part 330 includes a bulk section 334, straight fins 338, inclined fins 342, and vertical rods 346 that are similar to the bulk section 264, straight fins 268, inclined fins 272, and vertical rods 276 of the test part 260 of FIGS. 5A-5C. However, the inclined fins 342 are free of fillets adjacent to the bulk section 334.

Figure 8:
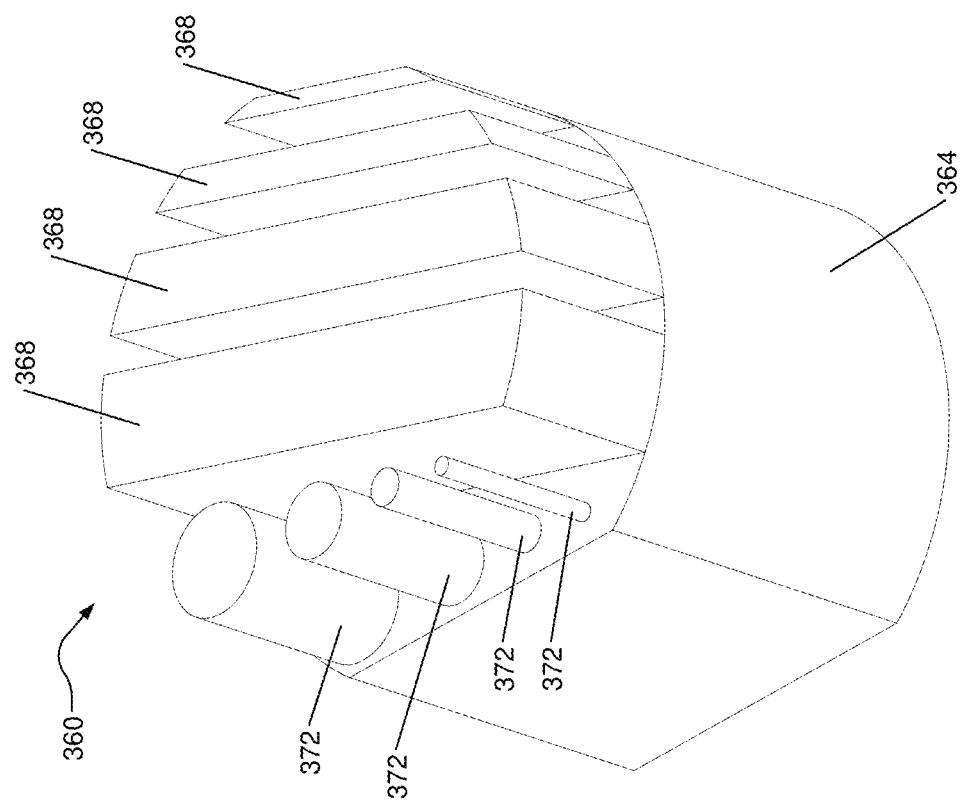
FIG. 8 is an isometric view of another test part.

In FIG. 8, another example test part 360 is shown. The test part 360 includes a bulk section 364, straight fins 368, and vertical rods 372 that are similar to the bulk section 264, straight fins 268, and vertical rods 276 of the test part 260 of FIGS. 5A-5C.

Figure 9:
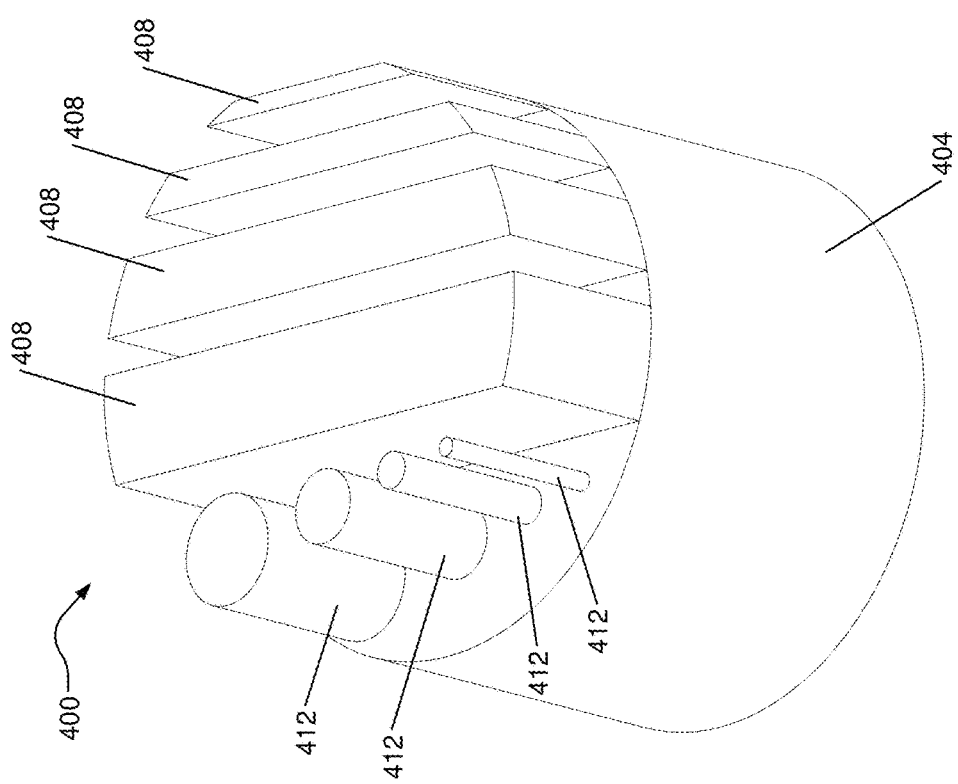
FIG. 9 is an isometric view of another test part.

In FIG. 9, another example test part 400 is shown. The test part 400 includes a bulk section 404, straight fins 408, and vertical rods 412. The straight fins 408 and the vertical rods 412 are similar to the straight fins 268 and the vertical rods 276 of the test part 260 of FIGS. 5A-5C.

Figure 10:
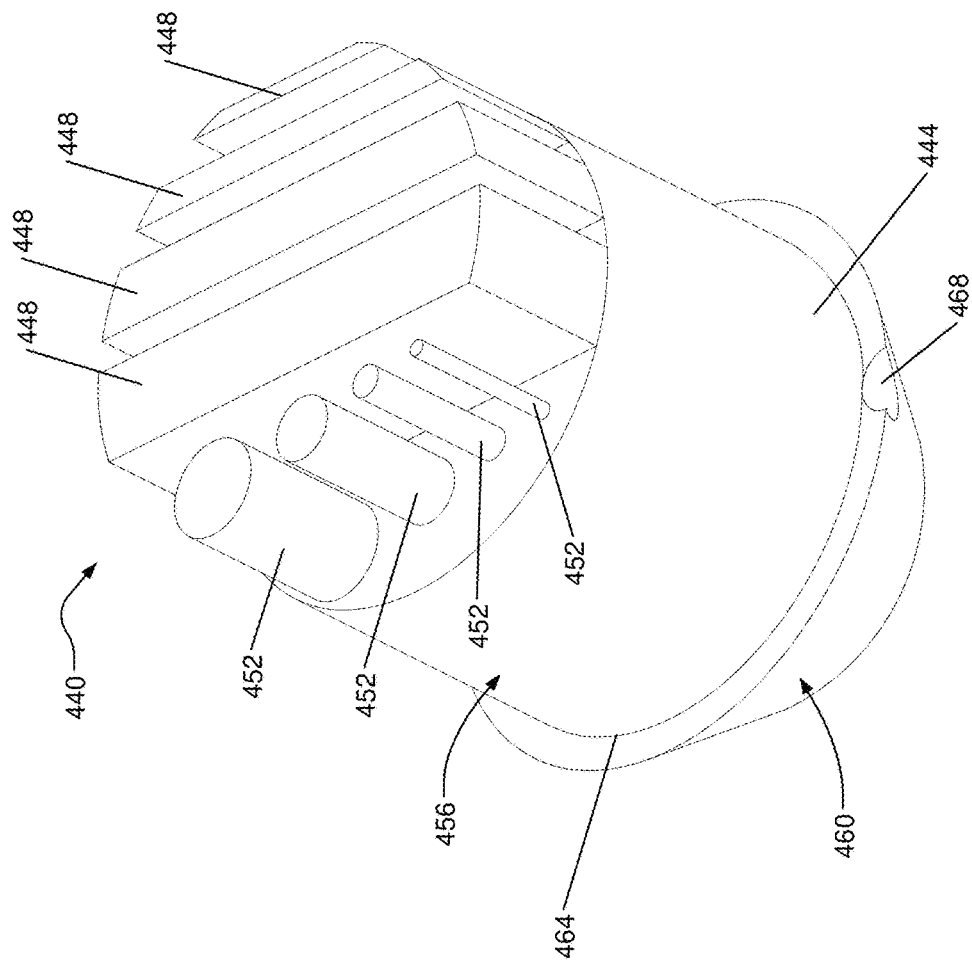
FIG. 10 is an isometric view of another test part.

In FIG. 10, another example test part 440 is shown. The test part 440 includes a bulk section 444, straight fins 448, and vertical rods 452. The straight fins 448 and the vertical rods 452 are similar to the straight fins 268 and the vertical rods 276 of the test part 260 of FIGS. 5A-5C.

The bulk section 444 includes a cylindrical portion 456 and a frustoconical portion 460. The straight fins 408 and the vertical rods 412 extend directly from the cylindrical portion 456. A diameter of the frustoconical portion 460 is larger than a diameter of the cylindrical portion 456 at an intersection 464 of the frustoconical portion 460 and the cylindrical portion 456. The frustoconical portion 460 defines a notch 468 adjacent to the intersection 464. The notch 468 may engage a sample holder to reduce or prevent rotation of the test part 440 within the sample holder.

Figure 11:
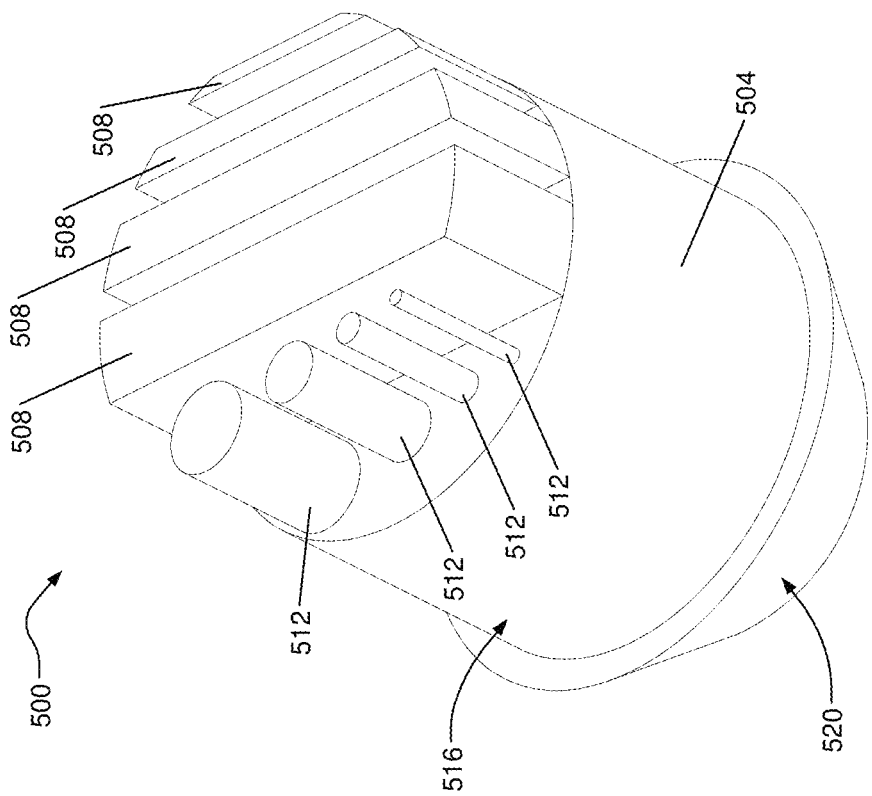
FIG. 11 is an isometric view of another test part.

In FIG. 11, another example test part 500 is shown. The test part 500 includes a bulk section 504, straight fins 508, and vertical rods 512. The straight fins 508 and vertical rods 512 are similar to the straight fins 268 and the vertical rods 276 of the test part 260 of FIGS. 5A-5C. The bulk section 504 includes a cylindrical portion 516 and a frustoconical portion 520, similar to the cylindrical portion 456 and the frustoconical portion 460 of the test part 440 of FIG. 10. However, the frustoconical portion 520 is free of a notch or other anti-rotation feature.

Figure 12:
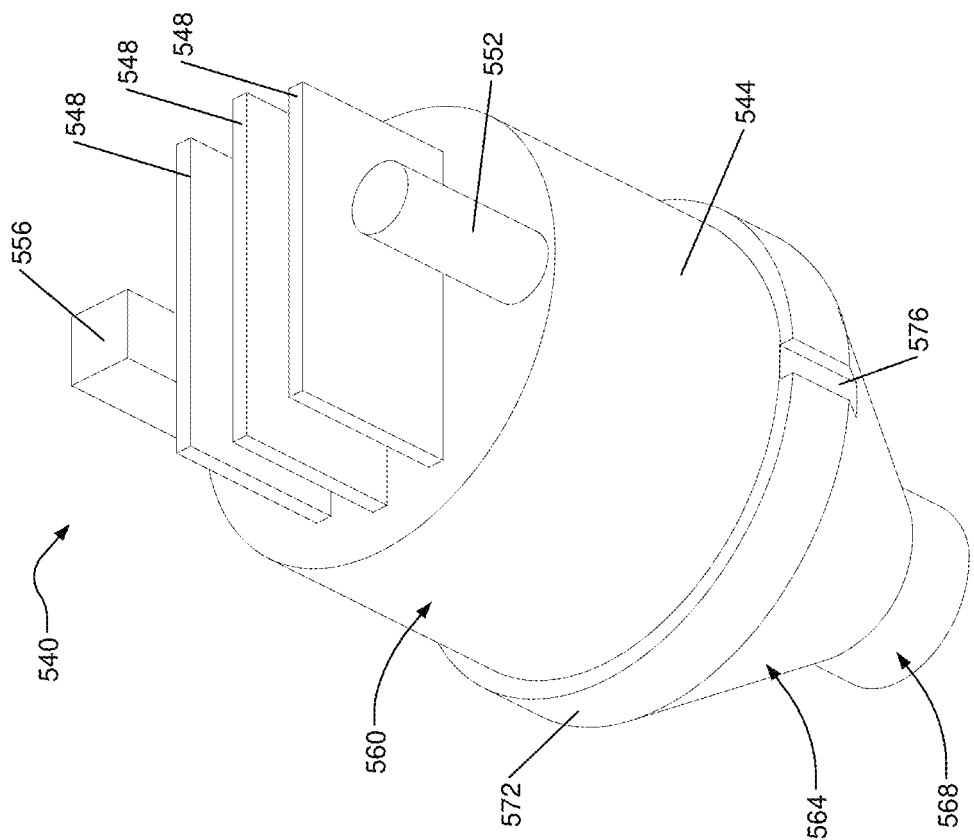
FIG. 12 is an isometric view of another test part.

In FIG. 12, another example test part 540 is shown. The test part 540 includes a bulk section 544, straight fins 548, a first vertical rod 552, and a second vertical rod 556. Each of the straight fins 548 has substantially the same thickness as the others of the straight fins 548. The first vertical rod 552 has a cylindrical shape. The second vertical rod 556 has a cuboid shape with a square cross section.

The bulk section 544 includes a first cylindrical portion 560, a frustoconical portion 564, and a second cylindrical portion 568. The frustoconical portion 564 is between the first and second cylindrical portions 560, 568. The straight fins 548 and first and second vertical rods 552, 556 extend directly from the first cylindrical portion 560.

The first cylindrical portion 560 includes a flange 572 adjacent to the frustoconical portion 564. The flange 572 defines a notch 576. The notch 576 may engage a sample holder to reduce or prevent rotation of the test part 540 in the sample holder.

As shown in the examples described above, test parts may include features such as a bulk section, straight fins, inclined fins, vertical holes, horizontal holes, vertical rods, and/or horizontal rods. A test part may include a single instance of a feature or multiple instances of the feature. Multiple instance of the feature may be substantially identical or have varying dimensions, such as thicknesses or diameters. Moreover, regions of the test part of feature types may be defined as distinct features, such as a periphery of one or more of the features (for example, bulk section periphery). Test parts according to the principles of the present disclosure may have different or additional features than those described above. In some examples, features may be selected from a library based on features of a production part to be printed. In other examples, features may be designed to mimic features of a final production part to be printed.

Flowcharts

Figure 13:
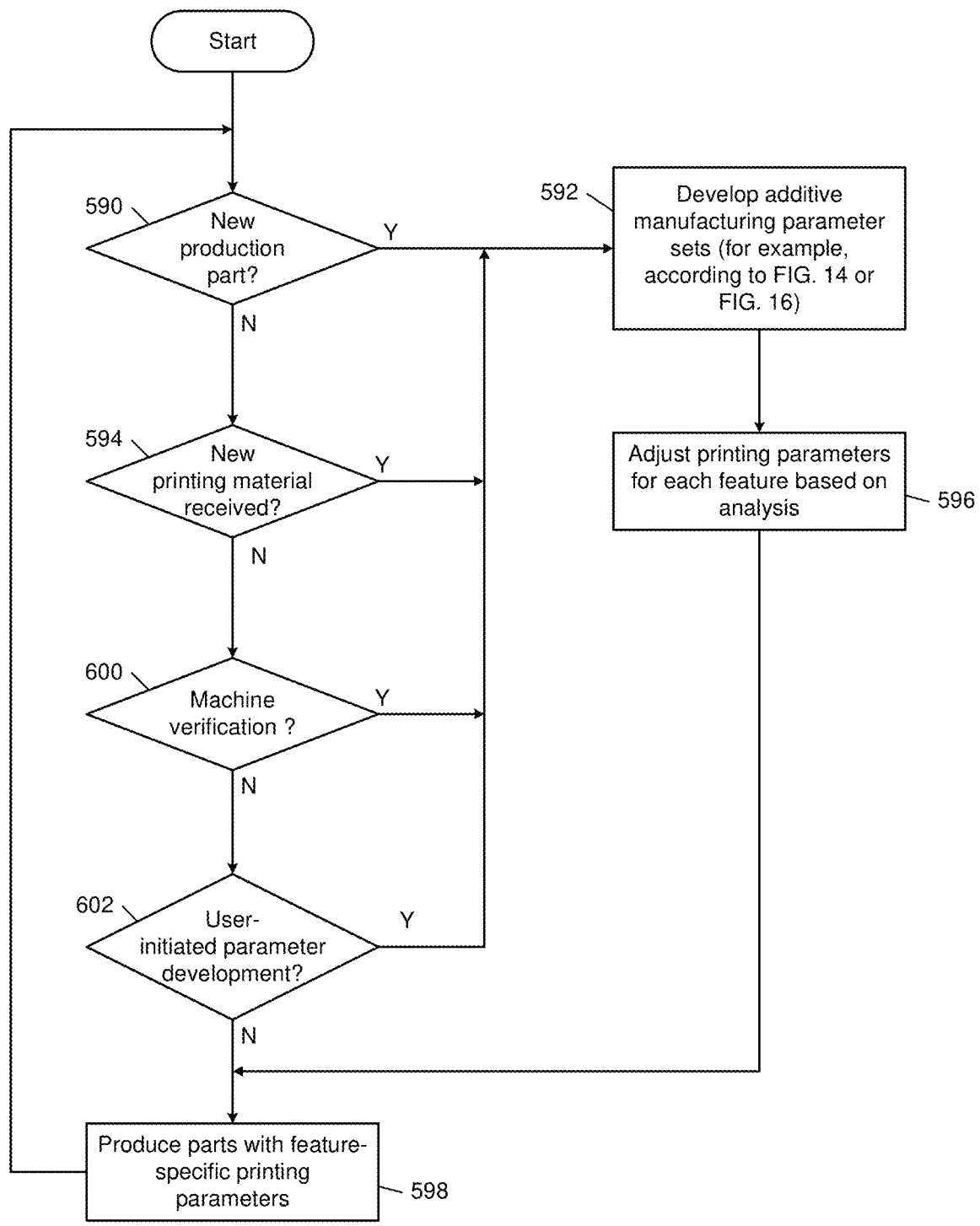
FIG. 13 is a flowchart of an example method of operating an additive manufacturing system of the present disclosure.
Figure 14:
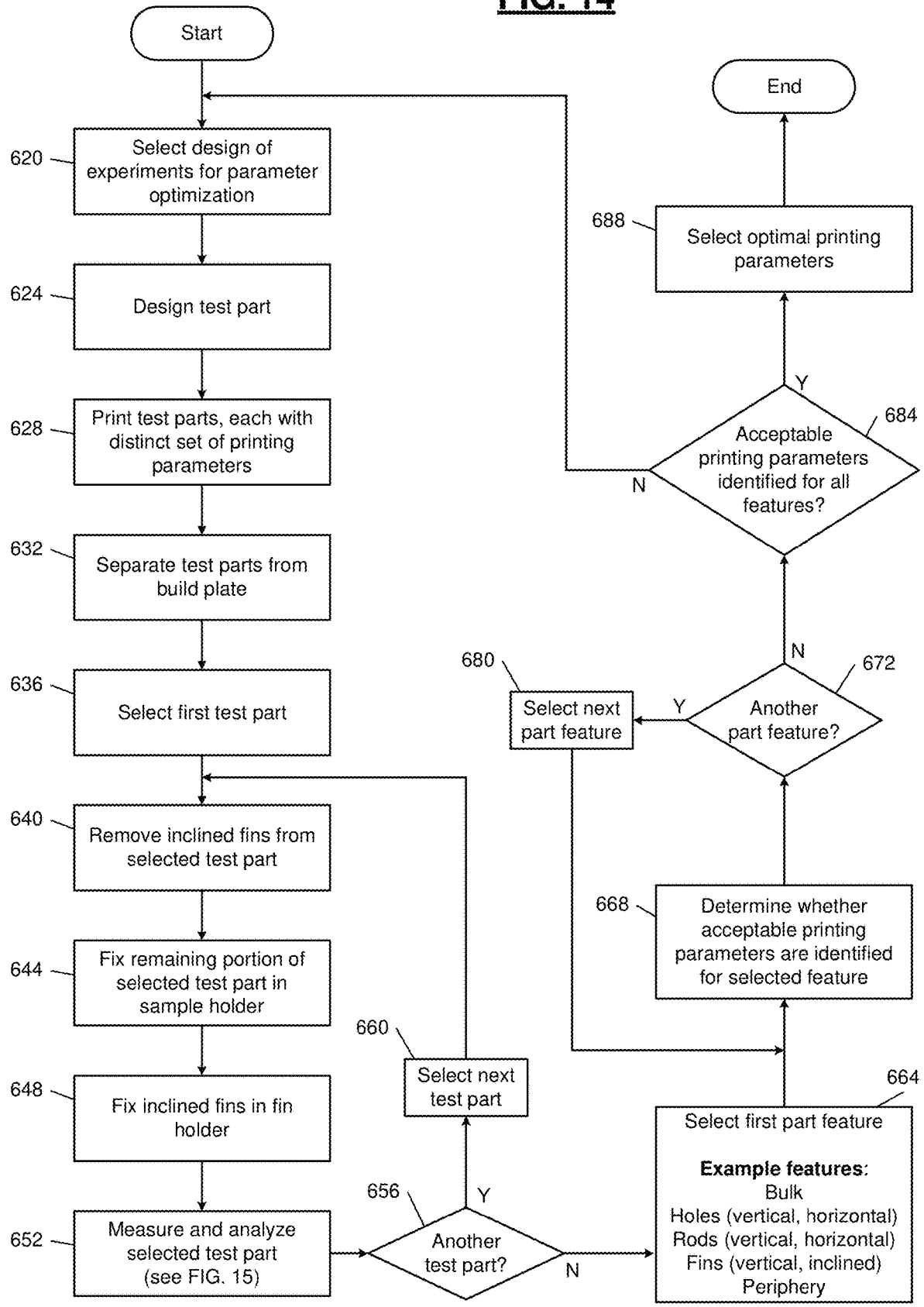
FIG. 14 is a flowchart of an example process used to control the additive manufacturing system of the present disclosure to develop a parameter set.
Figure 15:
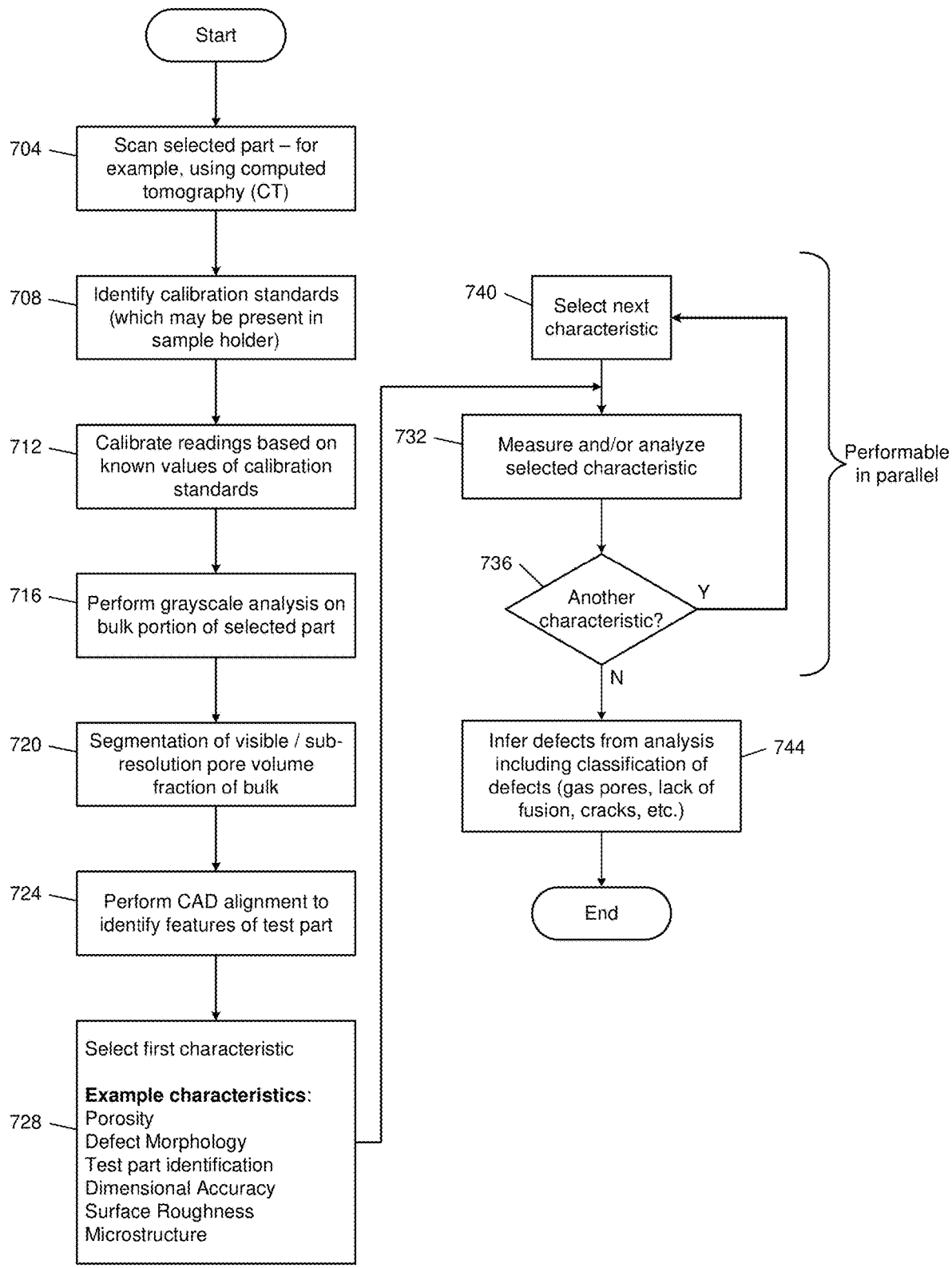
FIG. 15 is a flowchart of example analysis and measurement process performed on test parts according to the principles of the present disclosure.
Figure 16:
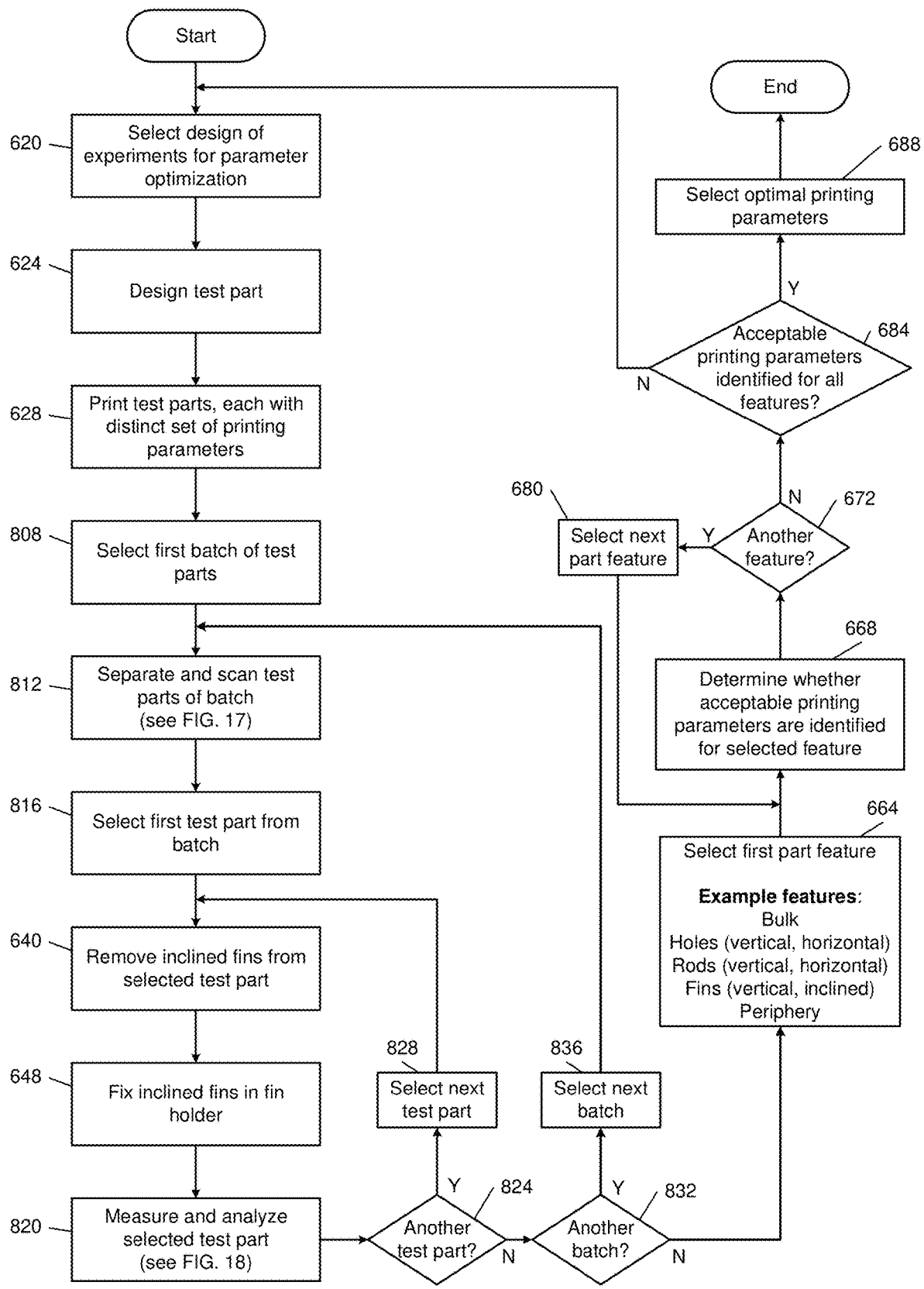
FIG. 16 is a flowchart of another example process used to control the additive manufacturing system of the present disclosure to develop a parameter set.
Figure 17:
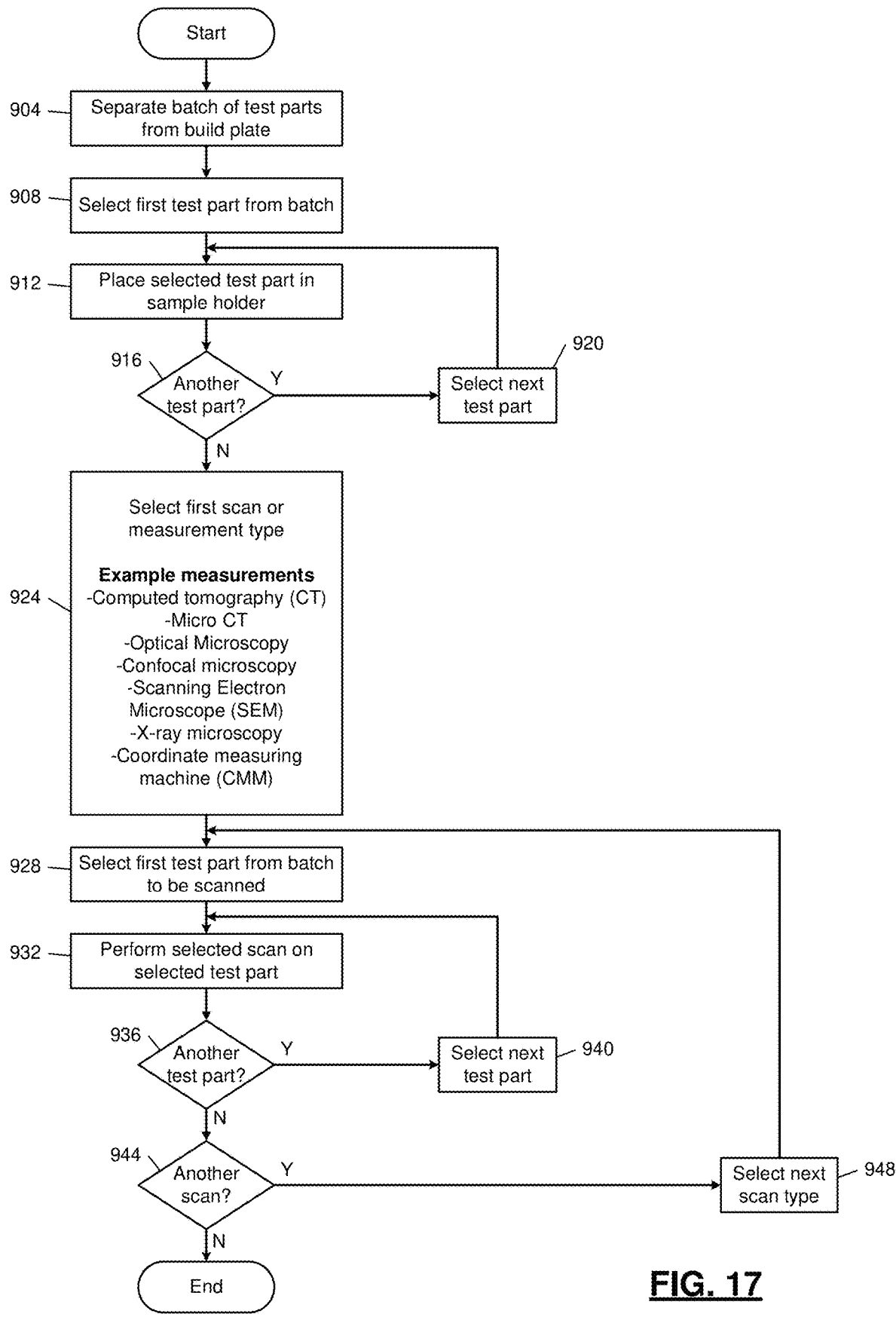
FIG. 17 is a flowchart of an example process of batch scanning test parts according to the principles of the present disclosure.

FIG. 13 depicts a method of operating an additive manufacturing (AM) machine according to the principles of the present disclosure. The present disclosure also provides methods of development of AM parameter sets according. FIGS. 13-14 depict a first example method of development of an AM parameter set. FIGS. 15-17 depict a second example method of development of an AM parameter set. Methods of development of AM parameter sets according to the present disclosure may omit some steps and/or include additional steps.

In FIG. 13, overall control of the AM system begins at 590. At 590, control determines whether a new production part is to be manufactured. If so, control transfers to 592; otherwise, control transfers to 594. For example, control may determine whether a new production part is to be manufactured based on user input or in response to a change in the CAD design.

Figure 18:
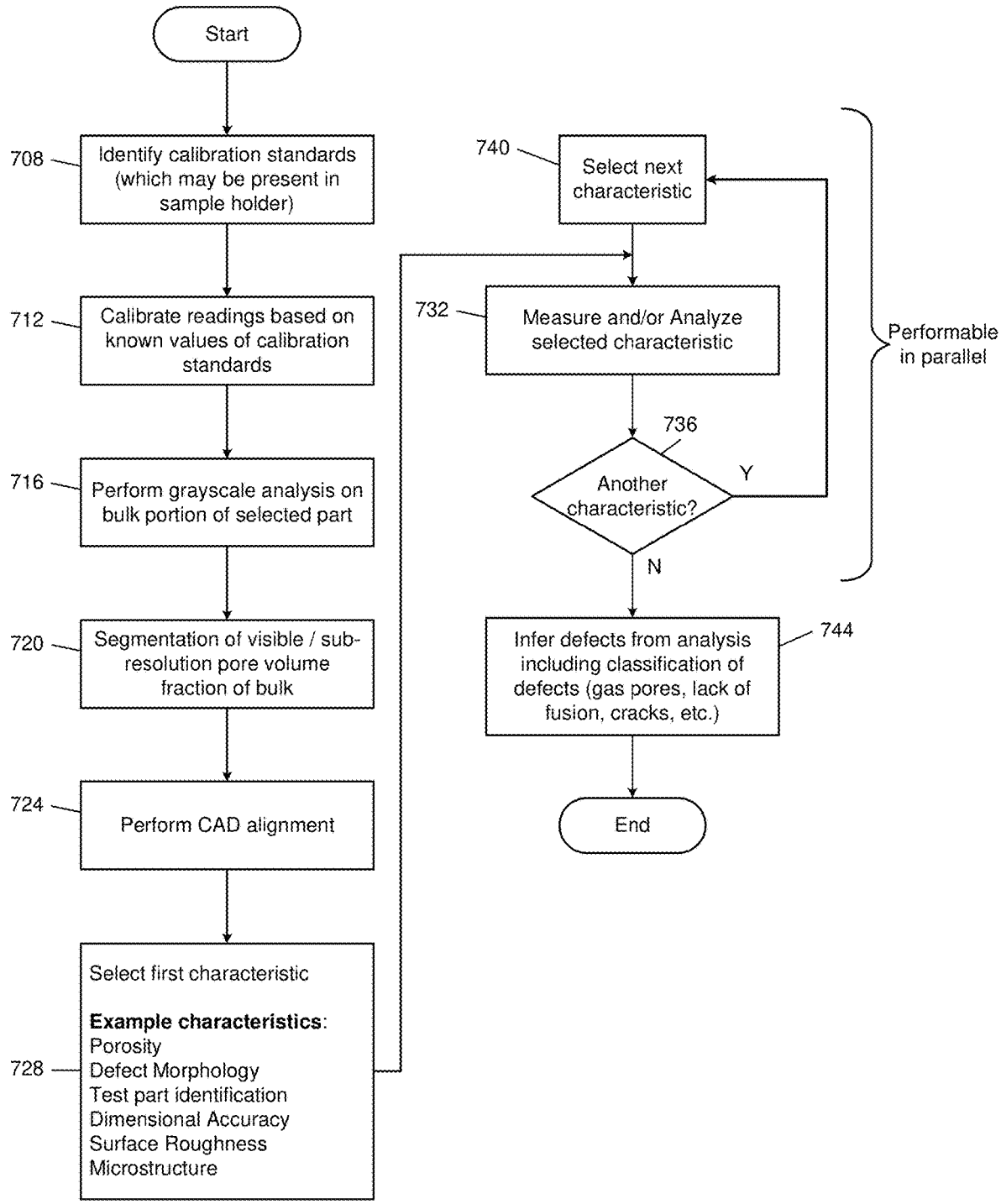
FIG. 18 is a flowchart of another example analysis and measurement process performed on test parts according to the principles of the present disclosure.

At 592, control performs a method of development of AM parameter sets, such as the method depicted in FIGS. 14-15 or the method depicted in FIGS. 16-18. Control transfers to 596, where control adjusts printing parameters for each feature based on the analysis. Control transfers to 598. At 598, control produces non-test parts (production parts) with feature-specific printing parameters. In other words, parts are manufactured with developed printing parameters that may vary depending on the feature of the part. For example, a horizontal cylinder in the part may be built using printing parameters that are different from a vertical cylinder within the part.

At 594, control determines whether a new printing material has been received. If so, control transfers to 592; otherwise, control transfers to 600. In various implementations, the printing material is a powder. The new printing material may be a new batch of printing material. The new batch of printing material may also have a different supplier and/or different formulation.

At 600, control determines whether machine verification is desired. If so, control transfers to 592; otherwise, control transfers to 602. At 598, control determines that machine verification is desired based on user input and/or occurrence of a predetermined condition or event on the AM machine.

At 602, control determines whether a user-initiated parameter development is desired. If so, control transfers to 592; otherwise, control transfers to 602. In various implementations, user-initiated parameter development may be desired for optimization of parameters sets for an existing production part (for example, to change a characteristic such as porosity); modification of a print strategy (including order and direction of printing); and/or optimization or identification of a build envelope (such as location of printing on a build plate). Control determines whether user-initiated parameter development is desired based on user input.

In FIG. 14, overall control of the AM system begins at 620. For illustration purposes only, the printing material in FIG. 14 is considered to be a powder. The user selects the powder to be used. The test part may be scaled based on the material chosen to achieve maximum x-ray transmission. The user selects a scope of study and creates a test object by selecting test sections, each of which will include one or more features of at least one feature type (for example, a set of vertical cylinders varying in diameter). In some implementations the features correspond to features of a final component to be printed (e.g., piston, nozzle, etc.).

At 620, control selects a design of experiments (DoE) for parameter optimization. The DoE includes printing parameters for each individual test part. For example, printing parameters may include scan speed, laser power, hatch spacing, and layer spacing in a laser-based process. The DoE may further include defining a position of each test part on a build plate.

The DoE may include distinct parameters for at least two of the test parts in the build (for example, the DoE may include distinct parameters for at least five of the test parts, at least 10 of the test parts, at least 25 of the test parts, or at least 50 of the test parts). In some implementations, each test part is printed with a distinct set of parameters. The distinct parameters may be different sets of parameters, where a parameter set is different from other parameter sets if at least one parameter in the set is different (for example, first and second parameter sets include the same laser power and scan speed, but different hatch spacing).

Control may select the DoE for parameter optimization based on a user-defined DoE or a control-created DoE. In some examples, the user may design CAD in software according to the principles of the present disclosure and export the CAD for print, then input the DoE values into the parameter control system 104. In other implementations, the user may design the CAD and DoE in the software according to the principles of the present disclosure, from which a final build file is exported. In other implementations, control creates a DoE based, at least in part, on the powder formulation (for example, default printing parameters suggested as stating points by the supplier of the powder or the supplier of the AM machine, which may be feature-specific, with different parameters recommended for different features), the features to be printed, desired characteristics, and/or data from previous builds.

At 624, control designs a test part. The test part is designed to have the features selected in the DoE. In some implementations, designing a test part at 624 may be performed prior to creating the DoE at 620.

At 628, control prints an array of test parts on a build plate. Each of the test parts is printed with a distinct set of printing parameters according to the DoE. For example, each part and each section may be printed with a specific set of values for variable printing parameters. See the following table for a visual representation:

| Part # | Section # | Variable1 | Variable2 | Variable3 | Result-1 | Result-2 | Result-3 | Result-4 | Result-5 | Results- |
|---|---|---|---|---|---|---|---|---|---|---|
| 1 | 1 | | | | | | | | | |
| 1 | 2 | | | | | | | | | |
| 1 | 3 | | | | | | | | | |
| 1 | 4 | | | | | | | | | |
| 1 | 5 | | | | | | | | | |
| 2 | 1 | | | | | | | | | |
| 2 | 2 | | | | | | | | | |
| 2 | 3 | | | | | | | | | |
| 2 | 4 | | | | | | | | | |
| . | . | | | | | | | | | |
| . | . | | | | | | | | | |

At 632, the test parts are physically separated from the build plate. At 636, the first test part is selected. At 640, the inclined fins are removed from the selected test part. For example, these removals may be performed by a saw or laser. At 644, control fixes the remaining portion of the selected test part in the sample holder. At 648, control fixes the inclined fins into a fin holder. In various other implementations, the sample holder accommodates the test part including the inclined fins.

At 652, the test part, including inclined fins, is measured and analyzed. An example of this measurement and analysis is described in FIG. 15. At 656, control determines whether another test part is available for measurement. If so, control transfers to 660, where the next test part is selected and control returns to 640; otherwise, control continues at 664.

At 664, control selects the first part feature type. For example, the list of feature types may include bulk, straight fin, inclined fin, rod, hole. In various implementations, each angle of inclined fin may be considered to be a separate feature type. Similarly, each size of rod or hole may be considered to be a separate feature type. Similarly, each thickness of straight fin may be considered to be a separate feature type. In various other implementations, the set of rods that are horizontally oriented are considered to be a single feature type while the set of rods that are vertically oriented or considered a single feature type. Similarly, the set of horizontal holes can be one feature type while the set of verticals is another feature type. In some examples, the test part includes different or additional feature types. The feature types may mimic features of a production part to be printed.

In various implementations, periphery is included as a distinct feature for at least one of the feature types, such as the bulk section (see, for example, the periphery 224 of the bulk section 202 of FIG. 2B). In some examples, more than multiple feature types (for example, bulk section, vertical rods, and inclined fins) are analyzed both overall and within a periphery.

Control continues at 668. At 668, control determines whether there are acceptable printing parameters from one or more of the test parts for the selected feature. Control makes these determinations based on user input. For example, measurements such as porosity, surface roughness, grain size, and dimensional accuracy may be compared with a threshold maximum or minimum acceptable values. In some implementations, control may look for the presence or absence of certain features, such as one or more defect types or a secondary phase in the microstructure analysis.

At 672, control determines whether there is another part feature to assess. If so, control transfers to 680, where control selects the next part feature and returns to 668; otherwise, control continues at 684.

At 684, control determines whether acceptable printing parameters were identified for all features. If so, control transfers to 688; otherwise, control transfers to 620. Control determines whether acceptable printing parameters were identified for each of the features based on the determination at 668. For certain additive manufacturing machines, printing parameters may not be easily adjusted within a single layer and therefore a single set of printing parameters needs to be identified that will achieve sufficient quality across all of the part features. This may require, for example significantly decreasing production speed.

At 688, control selects optimal or best printing parameters. Optimal printing parameters may be selected based on user-input. For example, optimal printing parameters may be selected to maximize or minimize certain values, ensure that certain values are within a predetermined or desired range, reduce or eliminate a characteristic (such as a defect or a secondary microstructure phase), or ensure presence of a characteristic (such as a secondary microstructure phase). Selection of optimal printing parameters may include ranking test parts or features based on desired characteristics. In various implementations, optimal printing parameters are manually-selected by a user. In various other implementations, selection of optimal printing parameters is omitted and the method ends after identifying acceptable printing parameters for all features.

In FIG. 15, example control of measurement and analysis of a test part is described. Control begins at 704, where the selected part is scanned, such as by using computed tomography (CT) to generate a CT image. At 708, control identifies calibration standards in the sample holder. For example, specific areas of the sample holder may be manufactured to high precision to have very specific densities. These densities may then be taken as known quantities against which the arguments can be compared. In various other aspects, calibration standards are independent of the sample holder.

At 712, control calibrates the readings of the densities (such as CT values) based on the known values of the calibration standards. For example, a linear, quadratic, or exponential equation may be generated so that the measured values of the calibration standards match the known values of the calibration standards. This mapping can then be applied to the values measured for the selected part.

At 716, a grayscale analysis is performed on the bulk section 202 of the selected part. Traditionally, features (such as pores) that are twice the resolution of the measurement are visible in the image while pores smaller than that only appear in the image as an intermediate grayscale value. This creates a problem because the resolution of the scan then determines what pores are identified. For example, a sample of pore sizes on the order of 50 μm will appear if imaged at a resolution of 10 μm per voxel but will disappear if imaged at a resolution of 100 μm per voxel.

The present disclosure presents a resolution independent way to quantify porosity from a CT image. Rather than explicitly identifying only very dark areas as pores, assessing an average grayscale value of a bulk area can result in an average density that indicates the porosity of the bulk section. For example, an average of all the voxels of the bulk area can be computed to produce the average grayscale value. Based on the calibration standards, this average grayscale value can be translated into a specific density, which combined with the density of the desired material can indicate porosity of the material.

At 720, control segments the apparent pore volume of the bulk between visible and sub-resolution pores. The visible pores may be identified as areas of darkness below a specified threshold. Once the identifiable pores are recorded, the remaining overall porosity is assumed to be contributed by sub-resolution pores.

At 724, control performs CAD alignment to identify features of the test part. CAD alignment is performed by comparing the CT image to a predefined geometry including the feature types of the test part. CAD alignment may also include defining the periphery feature (shell region) type based on identification of outer surfaces and a predetermined distance from the surface, which may be defined by the user.

At 728, control selects of a first characteristic to analyze. Example characteristics include porosity, defect morphology, test part identification, dimensional accuracy, surface roughness, and microstructure.

At 732, control measures and/or analyzes the selected characteristic. Analysis of some characteristics may be performed without any additional measurements. Analysis of other characteristics may require additional measurements of the test part in the sample holder or the fins in the fin holder, as described below. Characteristics may be measured and analyzed in any order and/or in parallel.

The selected characteristic may be porosity. Porosity is determined based on the CT image (such as a conventional CT image and/or a micro CT image). More particularly, porosity is determined based on CT segmentation and calibrated grayscale analysis. As described above, the analysis includes identification of both visible and sub-resolution pores. In various implementations, control may ultimately analyze porosity to identify print parameters that maximize or minimize overall porosity, visible pores, and/or sub-resolution pores.

The selected characteristic may be defect morphology. Defect morphology may be calculated from the CT image (such as a conventional CT image and/or a micro CT image). Defect morphology may include classification of pore size and pore shape. Pore size and shape correspond to classes of defects (such as lack of fusion, gas pores, cracks, keyhole porosity, inclusions, etc.). In various implementations, control may ultimately analyze defect morphology to reduce or eliminate one or more defect types, maximize or minimize pore size, and/or achieve a predetermined or desired pore shape.

The selected characteristic may be test part identification. Each test part is associated with a different unique identifier present on the test part. The unique identifier is used to correlate the test part with the parameter set used to build the test part. The 3D model of each copy of the test part may be programmatically modified to include the unique identifier so that the unique identifiers for the copies of the test parts are created as part of printing by the AM machine.

During test part identification, control uses the CT image and the CAD alignment to identify a region of a unique identifier. Control uses a machine or reader to interpret or read the unique identifier, thereby identifying the test part. In various implementations test part identification includes optical character recognition (OCR).

The unique identifier may be a 1-, 2-, or 3-dimensional code, such as a barcode, a QR code, or text. A 3-dimensional code may be raised, indented, or a combination of raised and indented. In some examples, a unique identifier includes a different material than a remainder of the test part, a different color than a remainder of the test part, and/or a different physical property than a remainder of the test part. Different properties may be achieved by process variations, such as laser speed, burn, and/or over or under exposure. A unique identifier that includes a different property need not be visually identifiable.

In some examples, the test part identification analysis eliminates manual entry of the unique identifier for each test part. In some examples, the test part identification analysis reduces or eliminates error in identifying test parts by correcting an expected identifier (such as an identifier input by a user) to an actual identifier (detected). In various implementations, test part identification may also be used to read unique identifiers on each of the inclined fins and identify the each of the inclined fins.

The selected characteristic may be dimensional accuracy. Dimensional accuracy can be determined by comparing the CT image to the CAD alignment for the test part. Dimensional accuracy may be evaluated for the overall test part or for individual features (such as holes, rods, and/or fins). Any deviation can be considered an error and therefore the print parameters with the least deviation can ultimately be selected.

The selected characteristic may be surface roughness. Surface roughness is measured and analyzed for each of first and second faces of the inclined fins. These measurements may be performed while the fins are in fin holders using laser or optical confocal microscopy of a tactile measurement (such as using a CMM). In various implementations, the inclined fins may be in a fin holder that can easily be rotated upside down to allow measurement of the opposite faces. In other implementations, the inclined fins may need to be removed from the first fin holder, turned upside down, and placed into a second fin holder for the measurement of the second surface. In other examples, such as when the fins remain on the test part, surface roughness may be measured using a CT image (such as conventional CT or micro CT) or an x-ray microscopy image.

Control analyzes the surface roughness of the inclined fins. Surface roughness may be expected to increase as the angle of the fin deviates from vertical. The set of printing parameters that results in the least surface roughness for all the inclined fins may be chosen as the desired printing parameter parameters. In other implementations, and as described in more detail FIG. 15, separate printing parameters may be selected for different degrees of inclination from vertical. For example, inclinations greater than 20° may be produced using a first set of printing parameters while angles less than 20° are produced using a second set of printing parameters. In various implementations, control may ultimately analyze surface roughness to identify parameters that minimize surface roughness.

The selected characteristic may be microstructure. Control measures microstructure using X-ray diffraction imaging and X-ray contrast tomography, SEM-based electron backscatter diffraction (EBSD), and/or optical (light) microscopy. X-ray diffraction imaging and X-ray contrast tomography are obtained from the CT device 124 and/or micro CT device 128. Microstructure may be analyzed on the overall test part, individual features (such as vertical fins), or on distinct features that are present specifically for microstructure analysis.

Analysis of microstructure includes measuring grain size (such as average grain size), identifying grain boundaries, identifying secondary phases (such as composition of secondary phases, amount of secondary phases, and characteristics of secondary phases), and analyzing and/or classifying texture. In various implementations, control ultimately optimizes microstructure characteristics based on a maximizing or minimizing average grain size, achieving predetermined or desired grain boundary characteristics, maximizing or minimizing an amount of a secondary phase, eliminating presence of a secondary phase, maximizing or minimizing a size of a secondary phase, and/or achieving a predetermined or desired texture.

At 744, control infers defects from the analysis. These defects may indicate issues with printing parameters and other factors, such as temperature control. Manual observation and machine learning can be applied to the image to classify defects in their origins. For example, spherical pores may indicate gas porosity. Elongated pores may indicate a lack of fusion or cracks. Pores with inclusions may indicate unsintered powder or a lack of fusion. Meanwhile, a row of pores or an isolated pore may simply be an unrepeatable defect that can be ignored.

In addition, results can be visualized using a variety of mechanisms. For example, figures of merit can be displayed in a graphical format selected from 2D, 3D, bar, binary, ternary, spider graph, etc., depending on context and user choice. Defects may be reported in coordinates based on the CAD alignment. Control then ends.

FIG. 16 depicts another method of developing AM machine parameter sets. Like reference numerals are used to identify similar or identical steps. The method begins at 620.

At 620, control selects a DoE for parameter optimization. At 624, control designs a test part. At 628, control prints tests parts.

At 808, control selects a first batch of test parts. A build may include an array of test parts. The array may include a single batch or multiple batches of test parts, depending on a capacity of the sample holder. At 812, the test parts of the batch are separated from the build plate and scanned. An example method for separating and scanning the test parts is shown in FIG. 17.

At 816, control selects a first test part from the batch. At 640, control removes inclined fins from the selected test part. At 648, control fixes the inclined fins in a fin holder. At 820, control measures and analyzes the selected test part. An example method of measuring and analyzing the selected test part is shown in FIG. 18.

At 824, control determines whether another test part from the batch is available. If so, control transfers to 828, where control selects the next test part and returns to 640; otherwise, control transfers to 832. At 832, control determines whether another batch from the build is available. If so, control transfers to 836, where control selects the next batch and returns to 812; otherwise, control transfers to 664.

At 664, control selects a first part feature. At 668, control determines whether acceptable printing parameters are identified for the selected feature. At 672, control determines whether there is another feature to be analyzed. If so, control transfers to 680, where control selects the next part feature and returns to 668; otherwise, control transfers to 684. At 684, control determines whether acceptable printing parameters have been identified for all features. If so, control transfers to 668 where optimal printing parameters are selected; otherwise, control transfers to 620.

Referring to FIG. 17, at 904, control separates the batch of test parts from the build plate, such as by with a saw or laser. At 908, control selects a first test part from the batch. At 912, control places the selected test part in the sample holder. At 916, control determines whether another test part from the batch is available to be placed in the sample holder. If so, control transfers to 920, where control selects the next test part and returns to 912; otherwise, control transfers to 924.

At 924, control selects a first scan or measurement type. For example, scan or measurement types may include CT, micro CT, optical (light) microscopy, confocal microscopy (laser or optical), SEM, X-ray microscopy, and CMM. At 828, control selects a first test part from the batch to be scanned. At 932, control performs the selected scan (such as CT) on the selected test part.

At 936, control determines whether another test part from the batch is available to be scanned. If so, control transfers to 940, where control selects the next test part and returns to 932; otherwise, control transfers to 944. At 944, control determines whether another type of scan is available. If so, control transfers to 948, where control selects the next scan type and returns to 928; otherwise, control ends.

Referring to FIG. 18, control performs steps 708, 712, 716, 720, 724, 728, 732, 736, 740, and 744 in a similar manner or the same manner as described above with respect to the method of FIG. 15.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase "at least one of A, B, and C" should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An apparatus comprising:
a control system configured to:
define a test part having a plurality of features of a plurality of feature types, wherein the plurality of features includes a first feature that is a bulk type and
control an additive manufacturing (AM) machine to print multiple copies of the test part,
wherein the AM machine operates according to a plurality of printing parameters,
wherein the control system is configured to generate, for each of the multiple copies, a set of values for the plurality of printing parameters, and
wherein the control system is configured to control the AM machine to print each of the multiple copies according to the respective set of values for the plurality of printing parameters;
a measurement system configured to obtain a computed tomography (CT) image of each of the copies of the test part; and
an analysis system configured to, for each of the plurality of feature types, analyze the CT images to identify a selected set of values for the plurality of printing parameters,
wherein the analysis system is configured to identify a portion of the CT image related to the first feature and assess density of the first feature based on an average grayscale value of the portion of the CT image and
wherein the control system is configured to control the AM machine to print production parts according to, for each feature type of the production parts, the selected set of values for the plurality of printing parameters.

2. The apparatus of claim 1 wherein the control system is configured to control the AM machine to print the multiple copies of the test part in response to a new printing material being introduced to the AM machine.

3. The apparatus of claim 2 wherein the printing material is a powder.

4. The apparatus of claim 3 wherein the AM machine uses selective laser sintering (SLS).

5. The apparatus of claim 1 wherein, for each of the multiple copies, the set of values of the plurality of printing parameters is distinct from all others of the multiple copies.

6. The apparatus of claim 1 wherein the control system is configured to control the AM machine to print a second batch of multiple copies of the test part in response to, for at least one of the feature types, the selected set of values for the plurality of printing parameters resulting in at least one feature of merit falling short of a threshold.

7. The apparatus of claim 1 further comprising a sample holder configured to hold a first part of the multiple copies, wherein the sample holder includes at least one calibration standard having known density values, and wherein the analysis system is configured to calibrate values of the CT image according to a relationship between measured values of the at least one calibration standard and the known density values.

8. The apparatus of claim 1 wherein the plurality of feature types includes the bulk type, a vertical fin type, a hole type, and a rod type.

9. The apparatus of claim 8 wherein the plurality of feature types includes the bulk type, the vertical fin type, a horizontal cylindrical hole type, a vertical cylindrical hole type, a horizontal rod type, and a vertical rod type.

10. The apparatus of claim 1 wherein:
the plurality of feature types includes the bulk type and an inclined fin type;
features having the inclined fin type are removed from the multiple copies; and
the features having the inclined fin type are measured using at least one of an optical microscope and a coordinate measuring machine.

11. The apparatus of claim 1 wherein the analysis system is configured to align the CT image of each of the copies of the test part with a test part design to identify each of the plurality of features on each of the copies of the test part.

12. The apparatus of claim 1 wherein:
the analysis system is configured to identify each of the copies of the test part by reading a unique identifier on the test part and
the unique identifiers for the copies of the test parts are created as part of printing by the AM machine.

13. The apparatus of claim 12 wherein the analysis system is configured to read the unique identifier using optical character recognition (OCR).

14. The apparatus of claim 12 wherein the unique identifier includes at least one of a one-dimensional barcode and a two-dimensional barcode.

15. The apparatus of claim 1 wherein the plurality of feature types includes a periphery defined within an outer surface of the test part and a predetermined distance from the outer surface.

16. The apparatus of claim 1 wherein the analysis system is configured to analyze a microstructure of each of the copies of the test part using at least one of X-ray diffraction imaging, X-ray contrast tomography, scanning electron microscope (SEM)-based electron backscatter diffraction (EBSD), and optical (light) microscopy.

17. A method comprising:
defining a test part having a plurality of features of a plurality of feature types, wherein the plurality of features includes a first feature that is a bulk type;
controlling an additive manufacturing (AM) machine to print multiple copies of the test part, wherein the AM machine operates according to a plurality of printing parameters, wherein the controlling includes:
for each of the multiple copies, generating a set of values for the plurality of printing parameters and
controlling the AM machine to print each of the multiple copies according to the respective set of values for the plurality of printing parameters;
obtaining a computed tomography (CT) image of each of the copies of the test part;
for each of the plurality of feature types, analyzing the CT images to identify a selected set of values for the plurality of printing parameters, wherein the analyzing includes:
identifying a portion of the CT image related to the first feature and
assessing density of the first feature based on an average grayscale value of the portion of the CT image; and
controlling the AM machine to print production parts according to, for each feature type of the production parts, the selected set of values for the plurality of printing parameters.

18. The method of claim 17 further comprising controlling the AM machine to print the multiple copies of the test part in response to a new printing material being introduced to the AM machine.

19. The method of claim 18 wherein the printing material is a powder.

20. The method of claim 19 wherein the AM machine uses selective laser sintering (SLS).

21. The method of claim 17 wherein, for each of the multiple copies, the set of values of the plurality of printing parameters is distinct from all others of the multiple copies.

22. The method of claim 17 further comprising controlling the AM machine to print a second batch of multiple copies of the test part in response to, for at least one of the feature types, the selected set of values for the plurality of printing parameters resulting in at least one feature of merit falling short of a threshold.

23. The method of claim 17 further comprising calibrating values of the CT image according to a relationship between measured values of at least one calibration standard and known density values of the at least one calibration standard.

24. The method of claim 17 wherein the plurality of feature types includes the bulk type, a vertical fin type, a hole type, and a rod type.

25. The method of claim 24 wherein the plurality of feature types includes the bulk type, the vertical fin type, a horizontal cylindrical hole type, a vertical cylindrical hole type, a horizontal rod type, and a vertical rod type.

26. The method of claim 17 wherein:
the plurality of feature types includes the bulk type and an inclined fin type and
the method further comprises:
removing features having the inclined fin type from the multiple copies and
measuring the features having the inclined fin type using at least one of an optical microscope and a coordinate measuring machine.

27. The method of claim 17, further comprising aligning the CT image of each of the copies of the test part with a test part design to identify each of the plurality of features on each of the copies of the test part.

28. The method of claim 17 further comprising:
identifying each of the copies of the test part by reading a unique identifier on the test part,
wherein the unique identifiers for the copies of the test parts are created as part of printing by the AM machine.

29. The method of claim 28 wherein the reading includes optical character recognition (OCR).

30. The method of claim 28 wherein the unique identifier includes at least one of a one-dimensional barcode and a two-dimensional barcode.

31. The method of claim 17, wherein the plurality of feature types includes a periphery defined within an outer surface of the test part and a predetermined distance from the outer surface.

32. The method of claim 17 further comprising analyzing a microstructure of each of the copies of the test part using at least one of X-ray diffraction imaging, X-ray contrast tomography, scanning electron microscope (SEM)-based electron backscatter diffraction (EBSD), and optical (light) microscopy.

33. A non-transitory computer-readable medium comprising processor-executable instructions that include:
 defining a test part having a plurality of features of a plurality of feature types, wherein the plurality of features includes a first feature that is a bulk type;
 controlling an additive manufacturing (AM) machine to print multiple copies of the test part, wherein the AM machine operates according to a plurality of printing parameters, wherein the controlling includes:
  for each of the multiple copies, generating a set of values for the plurality of printing parameters and
  controlling the AM machine to print each of the multiple copies according to the respective set of values for the plurality of printing parameters;
 obtaining a computed tomography (CT) image of each of the copies of the test part;
 for each of the plurality of feature types, analyzing the CT images to identify a selected set of values for the plurality of printing parameters, wherein the analyzing includes:
  identifying a portion of the CT image related to the first feature and
  assessing density of the first feature based on an average grayscale value of the portion of the CT image; and
 controlling the AM machine to print production parts according to, for each feature type of the production parts, the selected set of values for the plurality of printing parameters.

34. An apparatus comprising:
 processor hardware; and
 memory hardware coupled to the processor hardware, wherein the memory hardware is configured to store instructions, for execution by the processor hardware, that include:
 defining a test part having a plurality of features of a plurality of feature types, wherein the plurality of features includes a first feature that is a bulk type;
 controlling an additive manufacturing (AM) machine to print multiple copies of the test part, wherein the AM machine operates according to a plurality of printing parameters, wherein the controlling includes:
  for each of the multiple copies, generating a set of values for the plurality of printing parameters and
  controlling the AM machine to print each of the multiple copies according to the respective set of values for the plurality of printing parameters;
 obtaining a computed tomography (CT) image of each of the copies of the test part;
 for each of the plurality of feature types, analyzing the CT images to identify a selected set of values for the plurality of printing parameters, wherein the analyzing includes:
  identifying a portion of the CT image related to the first feature and
  assessing density of the first feature based on an average grayscale value of the portion of the CT image; and
 controlling the AM machine to print production parts according to, for each feature type of the production parts, the selected set of values for the plurality of printing parameters.

* * * * *